United States Patent [19]
Wakatake

[11] Patent Number: 4,558,267
[45] Date of Patent: Dec. 10, 1985

[54] ROTATING DISPLAY ELEMENT AND DISPLAY UNIT USING THE SAME

[76] Inventor: Yoshimasa Wakatake, No. 405, 9-5 Tamagawa 1-chome, Setagaya-Ku, Tokyo, Japan

[21] Appl. No.: 489,550

[22] Filed: Apr. 28, 1983

[30] Foreign Application Priority Data

Apr. 30, 1982 [JP] Japan .................................. 57-74009

[51] Int. Cl.⁴ ................................................ G05B 19/40
[52] U.S. Cl. ..................................... 318/696; 318/685; 318/103; 318/40; 318/49; 318/112
[58] Field of Search .................. 318/696, 45, 103, 685, 318/672, 671, 39, 40, 49, 102, 112, 490; 340/806, 811; 310/187

[56] References Cited

U.S. PATENT DOCUMENTS

| | | | |
|---|---|---|---|
| 2,474,648 | 6/1949 | Binney | 310/187 X |
| 3,311,911 | 3/1967 | Pursiano | 318/696 X |
| 3,581,183 | 5/1971 | Piazza | 318/696 |
| 3,671,841 | 6/1972 | Hoffman | 318/696 |
| 3,739,252 | 6/1973 | Hays | 318/696 |
| 4,152,994 | 5/1979 | Sugiyama | 318/45 X |

*Primary Examiner*—William M Shoop, Jr.
*Assistant Examiner*—Patrick C. Keane
*Attorney, Agent, or Firm*—Murray, Whisenhunt and Ferguson

[57] ABSTRACT

A rotating display element is provided with a display surface structure which has a plurality of display surfaces and is mounted on a rotor of a permanent magnet type stepping motor mechanism in a manner to incorporate therein the stepping motor mechanism. The display surfaces of the display surface structure are disposed side by side around the axis of the rotor. The rotor is provided with a double-pole permanent magnet member having north and south magnetic poles spaced apart a 180° angular distance around the axis of the rotor. A stator of the stepping motor mechanism is provided with a first magnetic member having first and second magnetic poles disposed at 180° intervals around the axis of the rotor, a second magnetic member having third and fourth magnetic poles disposed at 90° intervals around the axis of the rotor, a first exciting winding wound on the first magnetic member and a second exciting winding wound o the second magnetic member.

A display unit is provided with the rotating display element and a driving device for driving it. The driving device has first and second power supply means for supplying power to the first exciting winding in reverse directions and third and fourth power supply means for supplying power to the second exciting winding in reverse directions.

2 Claims, 29 Drawing Figures

ROTATING DISPLAY ELEMENT AND DISPLAY UNIT USING THE SAME

BACKGROUND OF THE INVENTION

1. Field of the Invention

The present invention relates to a rotating display element which is provided with a display surface structure having a plurality of display surfaces and is arranged to select one of the display surfaces by rotating the display surface structure. Furthermore, the invention pertains to a display unit using such a rotating display element.

2. Description of the Prior Art

Heretofore, various rotating display elements of this kind have been proposed, which are defective in that a rotating mechanism for driving the display surface structure must be provided separately of the rotating display element, or in that a selected one of the display surfaces of the display surface structure does not assume its correct position.

Furthermore, a variety of display units using the rotating display element have also been proposed in the past but, in addition to the abovesaid defects of the rotating display element, the conventional display units possess the drawback of involving the use of complex means for selecting the plurality of display surfaces of the display surface structure of the rotating display element.

SUMMARY OF THE INVENTION

It is therefore an object of the present invention to provide a novel rotating display element free from the abovesaid defects and a display unit using such a display element.

Other objects, features and advantages of the present invention will become more apparent from the following description taken in conjunction with the accompanying drawings.

DESCRIPTION OF THE PREFERRED EMBODIMENTS

Figure 1:
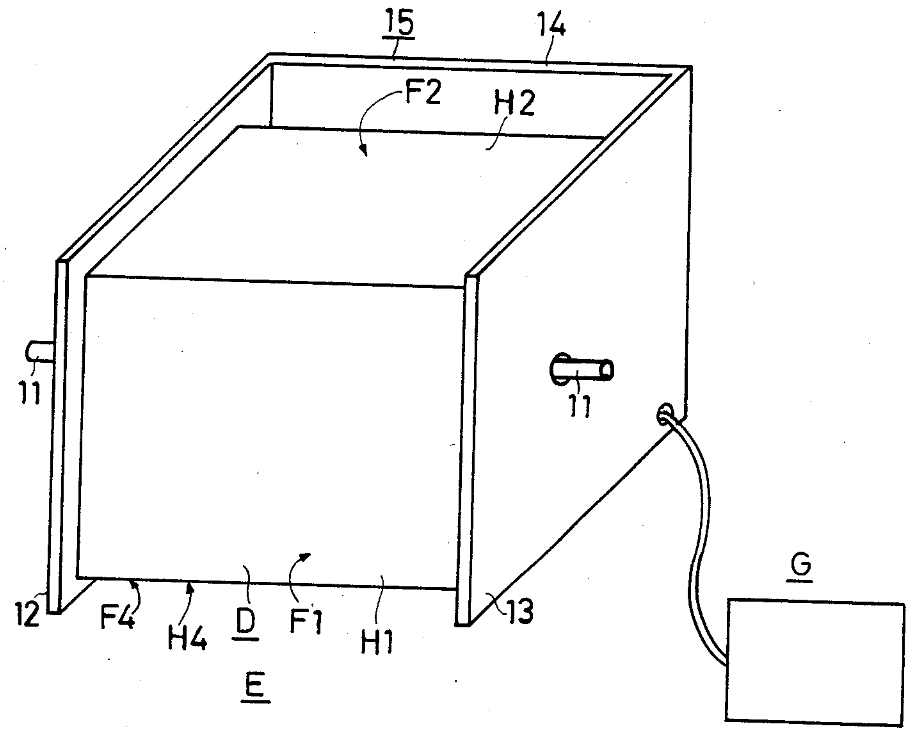
FIG. 1 is a perspective view schematically illustrating an embodiment of the display unit emeploying the rotating display element of the present invention.

FIG. 1 illustrates, in perspective, an embodiment of the display unit employing rotating display element of the present invention. The display unit is provided with the rotating display element (hereinafter referred to as the display element for the sake of brevity) E and a driving device G for driving them.

The display element E has a display surface structure D and a permanent magnet type stepping motor mechanism (hereinafter referred to simply as motor mechanism) identified by Q in FIGS. 2 to 4.

Figure 2:
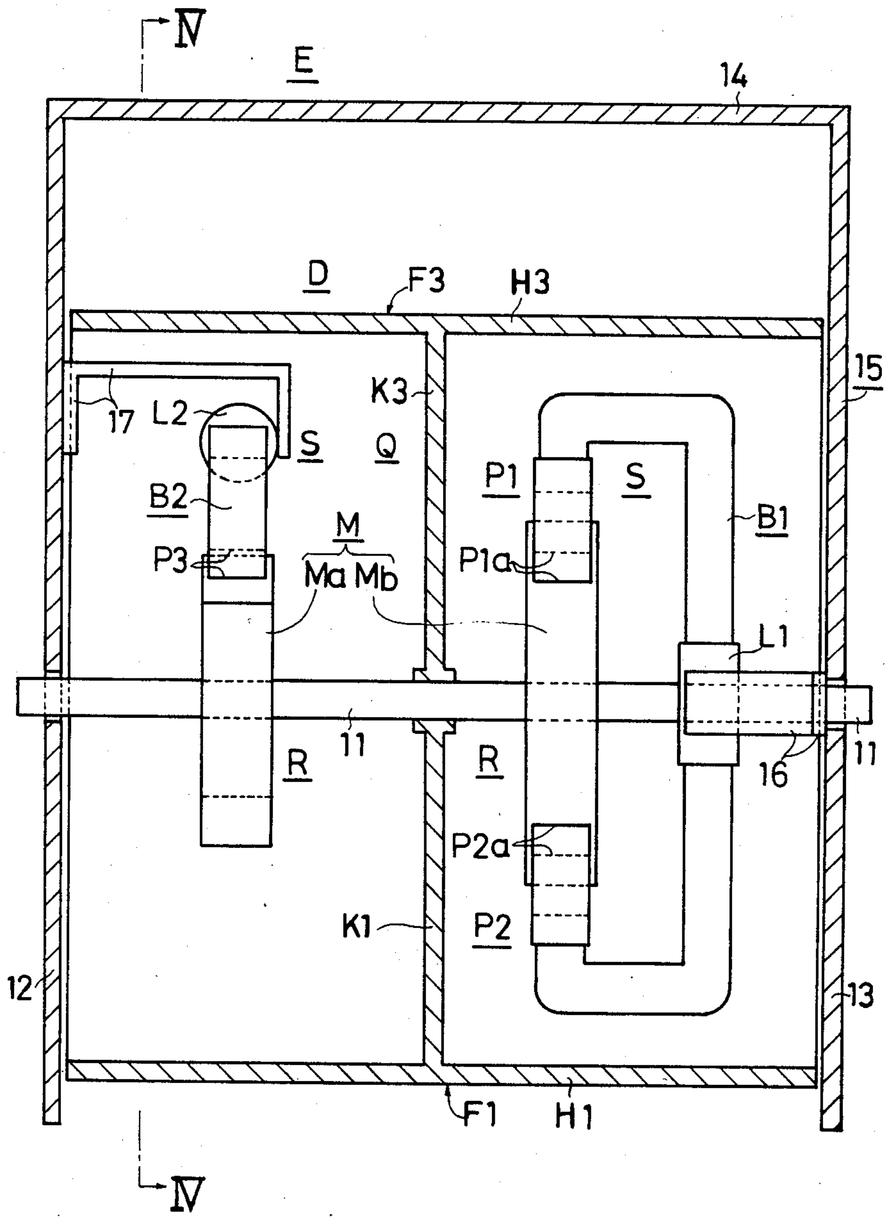
FIGS. 2 and 3 are a plan view and a front view, partly in section, showing an example of the rotating display element used in the display unit of FIG. 1.
Figure 3:
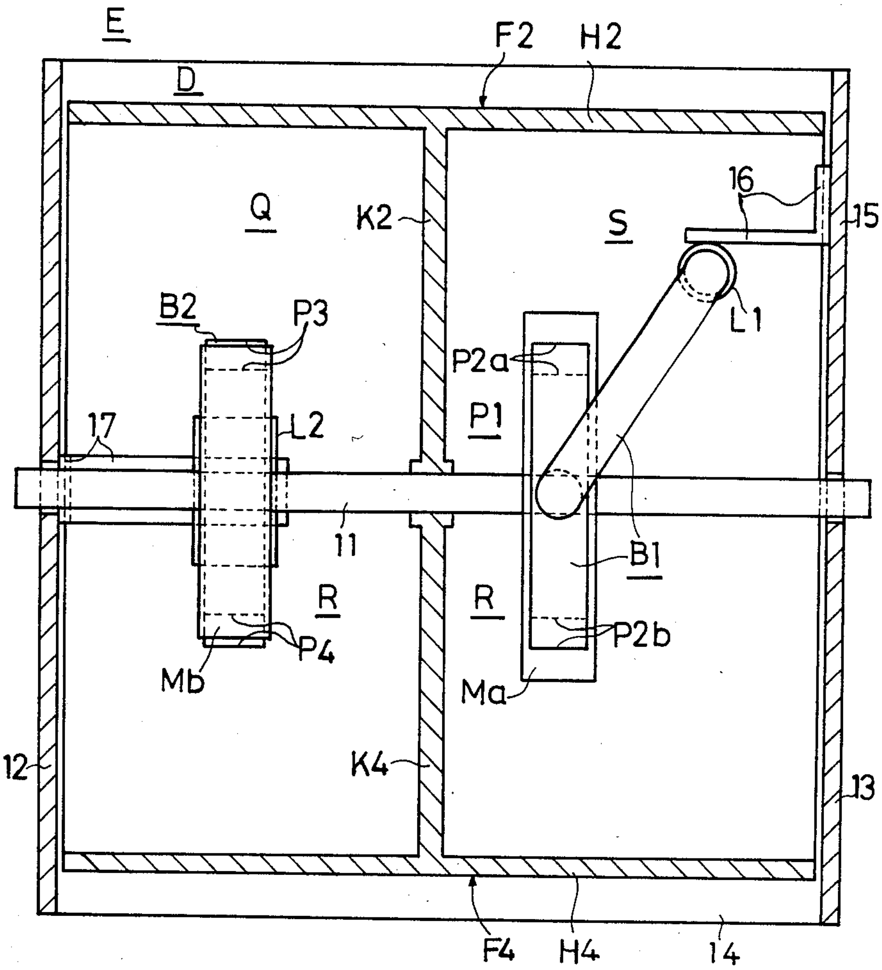
Figure 4:
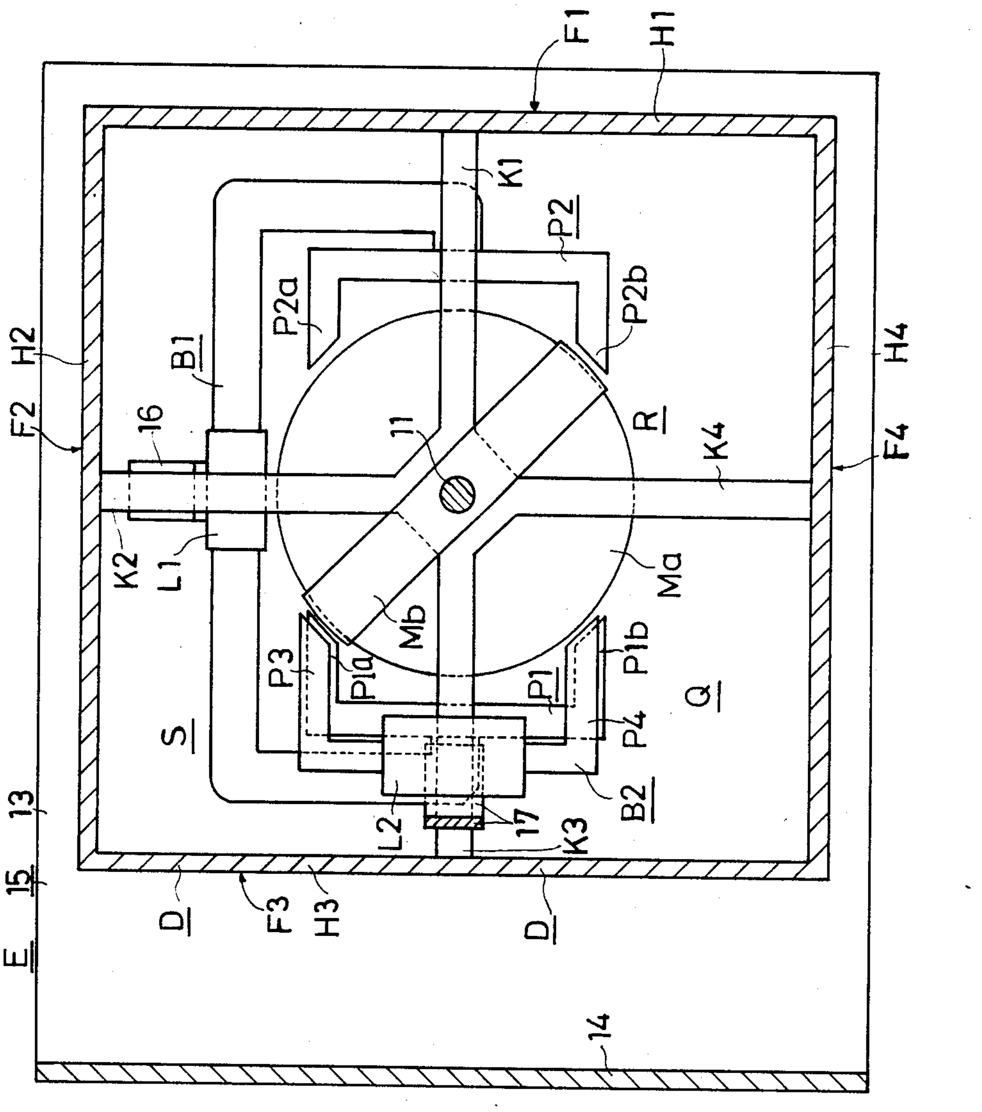
FIG. 4 is a side view, partly in section, as viewed from the line IV—IV in FIG. 2.

As will be seen from FIGS. 2 to 4, an example of the display surface structure D has a tubular body and four display panels H1 to H4 disposed at 90° intervals around its axis. On the outer surfaces of the four display panels H1 to H4 are formed display surfaces F1 to F4, respectively.

An example of the motor mechanism Q has a rotary shaft 11, on which is mounted a double-pole permanent magnet member M having north and south magnetic poles.

The north and south magnetic poles of the double-pole permanent magnet member M are spaced apart an angular distance of 180° across the rotary shaft 11. The double-pole permanent magnet member M comprises two double-pole permanent magnets Ma and Mb disposed side by side in the lengthwise direction of the rotary shaft 11. The one double-pole permanent magnet Ma is a disc-shaped one, which is magnetized with north and south magnetic poles at diametrically opposite positions. The other double-pole permanent magnet Mb is a bar-shaped one, the both free end portions of which are respectively magnetized with north and south magnetic poles at angular intervals of 180° in the radial direction of the rotary shaft 11. The north magnetic poles of the double-pole permanent magnents Ma and Mb are disposed at the same rotational angular position around the rotary shaft 11 and, consequently, the south magnetic poles of the double-pole permanent magnets Ma and Mb are also disposed at the same rotational angular position around the rotary shaft 11.

The rotary shaft 11 and the double-pole permanent magnet M constitute a rotor R of the motor mechanism Q.

The rotor R of the motor mechanism Q is rotatably supported by a support 15 composed of left, right and rear panels 12, 13 and 14. That is, the rotary shaft 11 forming the rotor R is rotatably mounted to extend between the left and the right panels 12 and 13 of the support 15.

An example of the motor mechanism Q comprises a magnetic member B1 which has magnetic poles P1 and P2 acting on the north and south magnetic poles of the double-pole permanent magnent member M, a magnetic member B2 which similarly has magnetic poles P3 and P4 acting on the north and south magnetic poles of the double-pole permanent magneti member M, an exciting winding L1 wound on the magnetic member B1 in a manner to excite the magnetic poles P1 and P2 in reverse polarities, and an exciting winding L2 wound on the magnetic member B2 in a manner to excite the magnetic poles P3 and P4 in reverse polarities.

The magnetic poles P1 and P2 of the magnetic member B1 are spaced apart at angular intervals of 180° around the axis of the rotor R, i.e. the rotary shaft 11. The magnetic pole P3 and P4 of the magnetic member B2 are spaced apart at angular intervals of 90° around the axis of the rotor R and accordingly the rotary shaft 11.

The magnetic pole P1 of the magnetic member B1 has magnetic pole portions P1*a* and P1*b* disposed at 90° intervals around the rotary shaft 11 of the rotor R. The magnetic pole P2 of the magnetic member B1 also has magnetic pole portions P2*a* and P2*b* similarly disposed at 90° intervals around the rotary shaft 11 of the rotor R.

The magnetic members B1 and B2 and the exciting windings L1 and L2 make up a stator S of the motor mechanism Q.

The stator S of the motor mechanism Q is fixedly supported by the aforementioned support 15. That is, the magnetic member B1 and the exciting winding L1 wound thereon are fixed to the support 15 through a support rod 16 which extends between the position of the exciting winding L1 and the inner side wall of the right panel 13 of the support 15. Likewise the magnetic member B2 and the exciting winding L2 wound thereon are fixed to the support 15 through a support rod 17 which extends between the position of the exciting winding L2 and the inner side wall of the left panel 12 of the support 15.

The display surface structure D is mounted on the rotor R of the motor mechanism Q in such a manner that it houses therein the motor mechanism Q. That is, four support rods K1 to K4, extending in the radial direction of the rotary shaft 11 at 90° intervals, are fixed at one end to the rotary shaft 11 between the double-pole permanent magnets Ma and Mb mounted thereon, the free ends of the support rods K1 to K4 being secured to the display panels H1 to H4 of the display surface structure D on the inside thereof.

Figure 5:
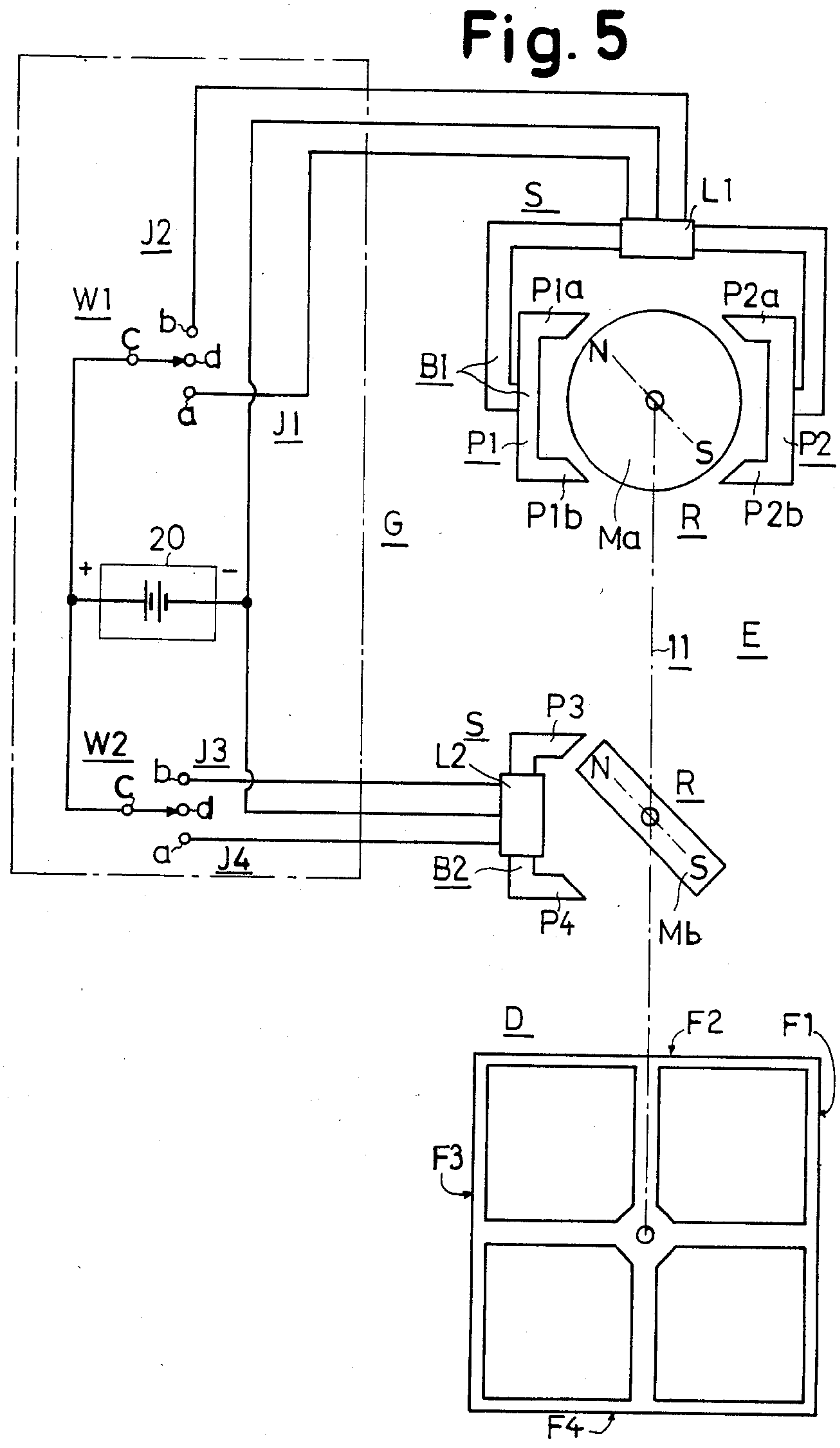
FIGS. 5 to 12, inclusive, are schematic diagrams explanatory of the operation of the display unit of the present invention shown in FIG. 1.
Figure 6:
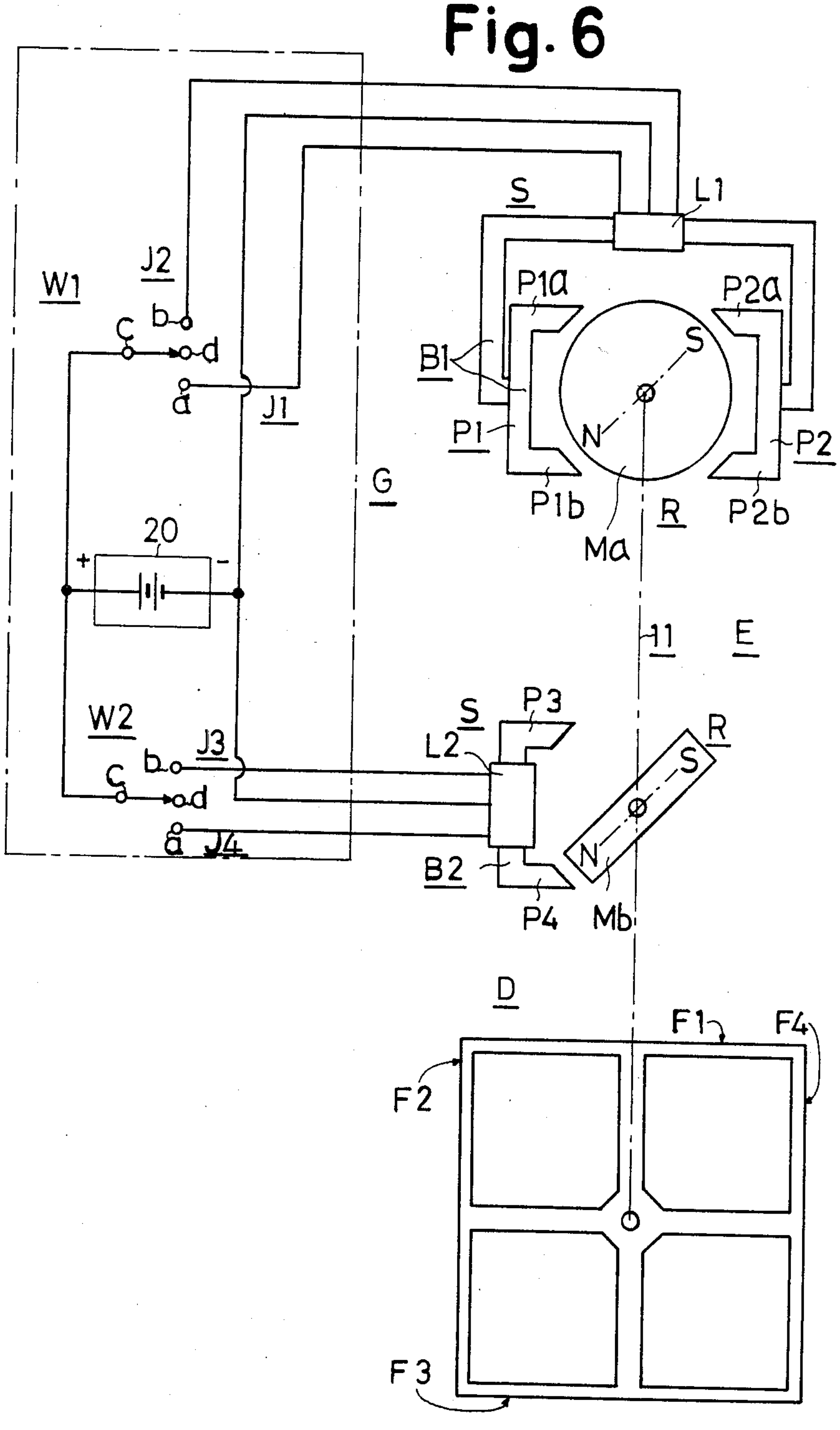
Figure 7:
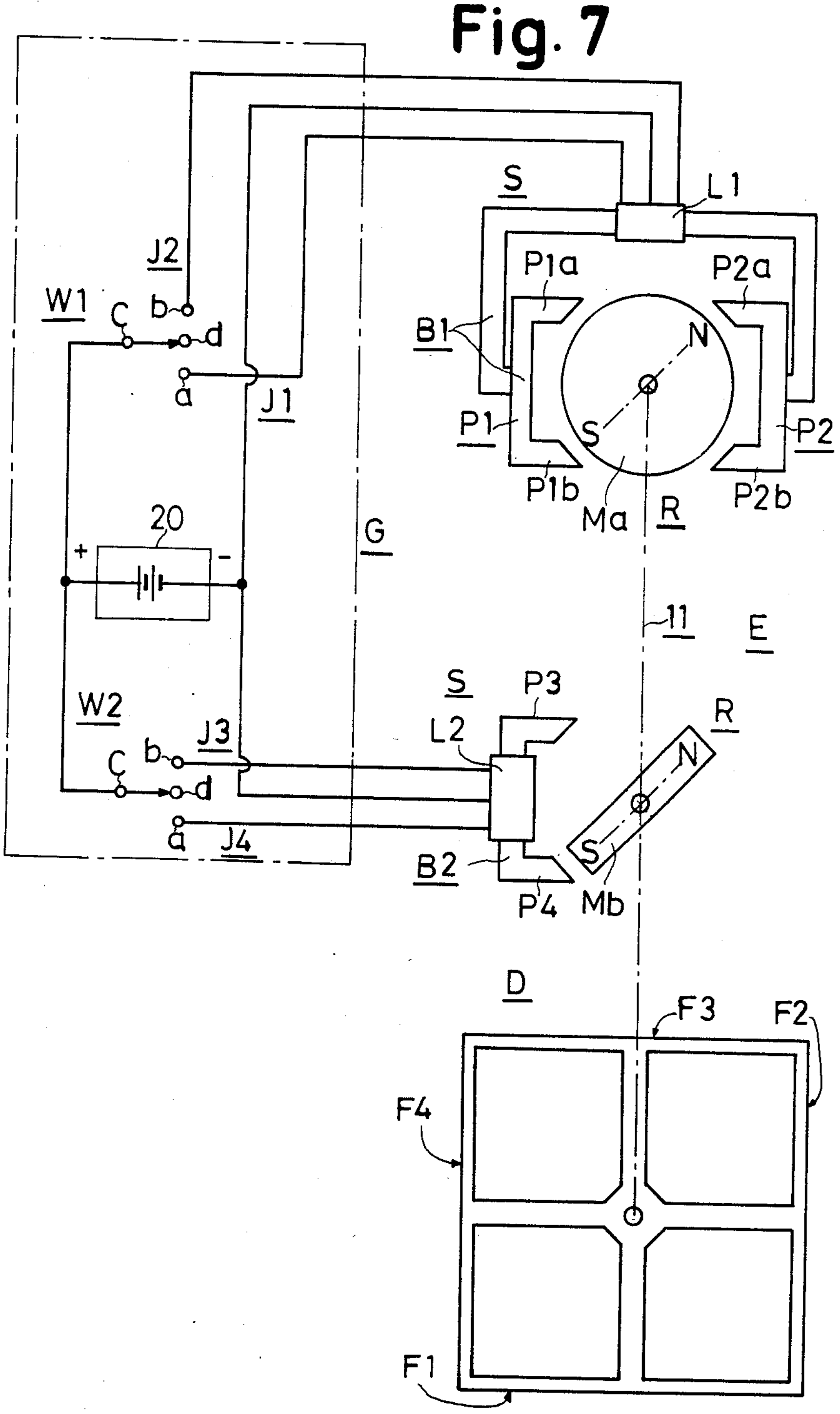
Figure 8:
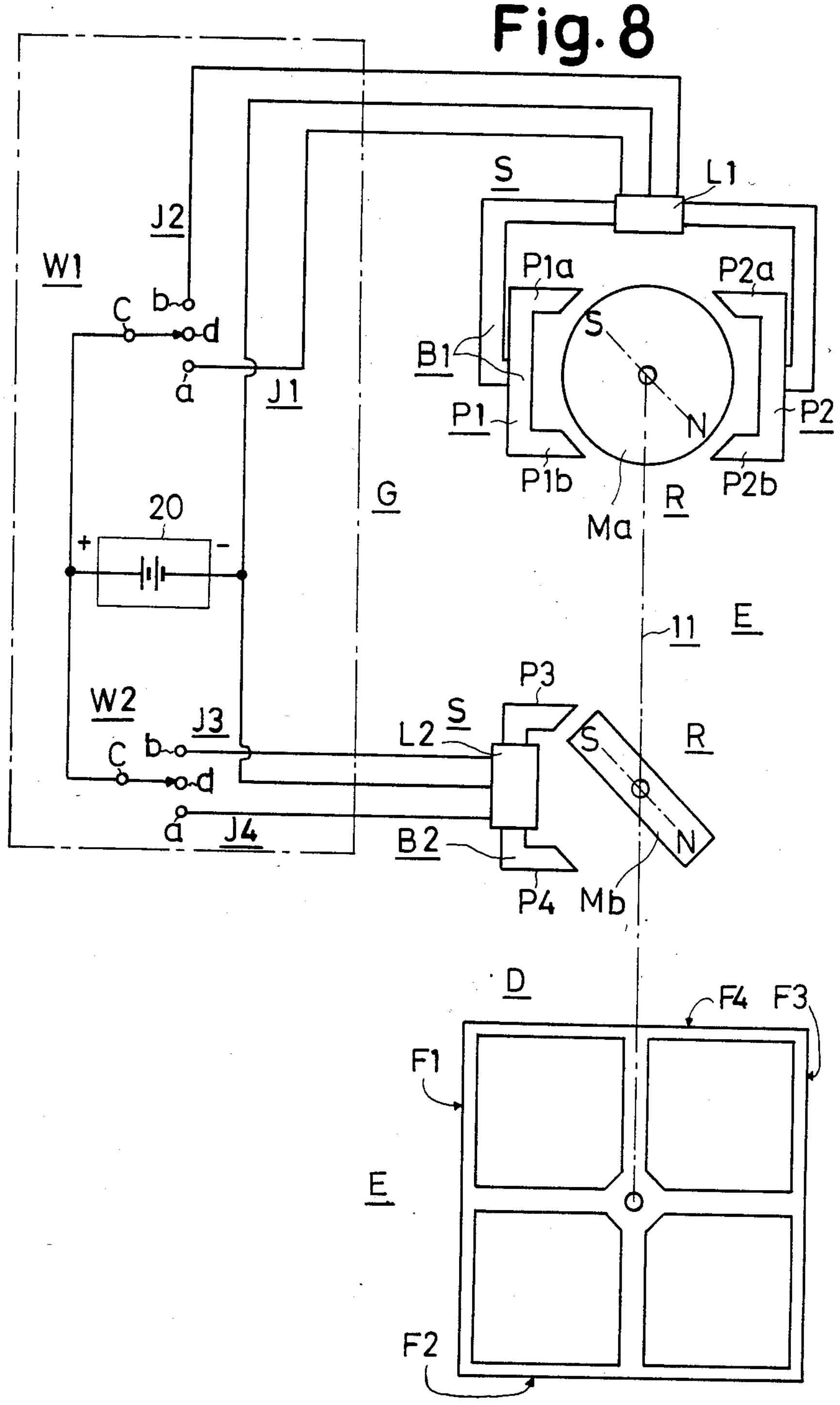
Figure 9:
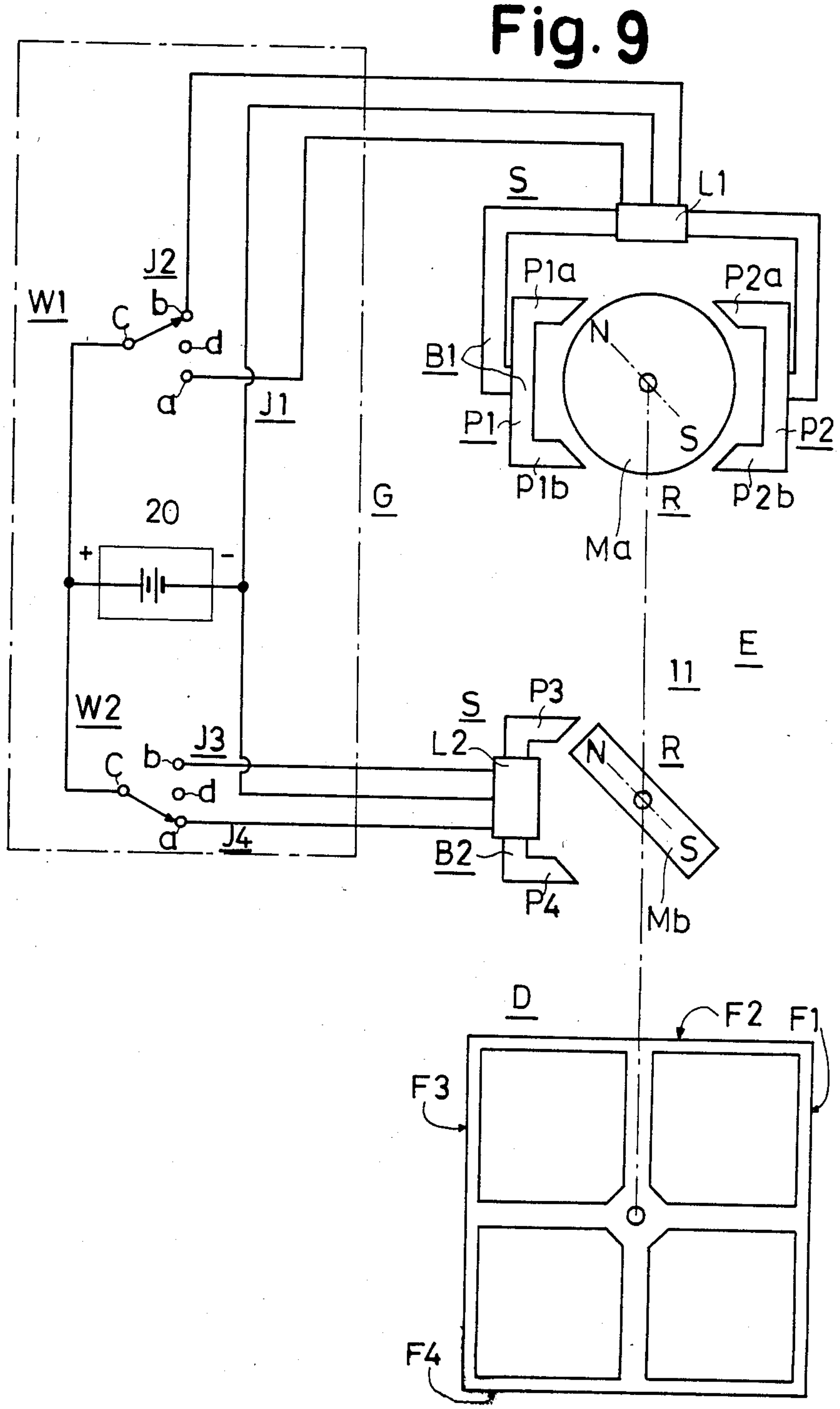
Figure 10:
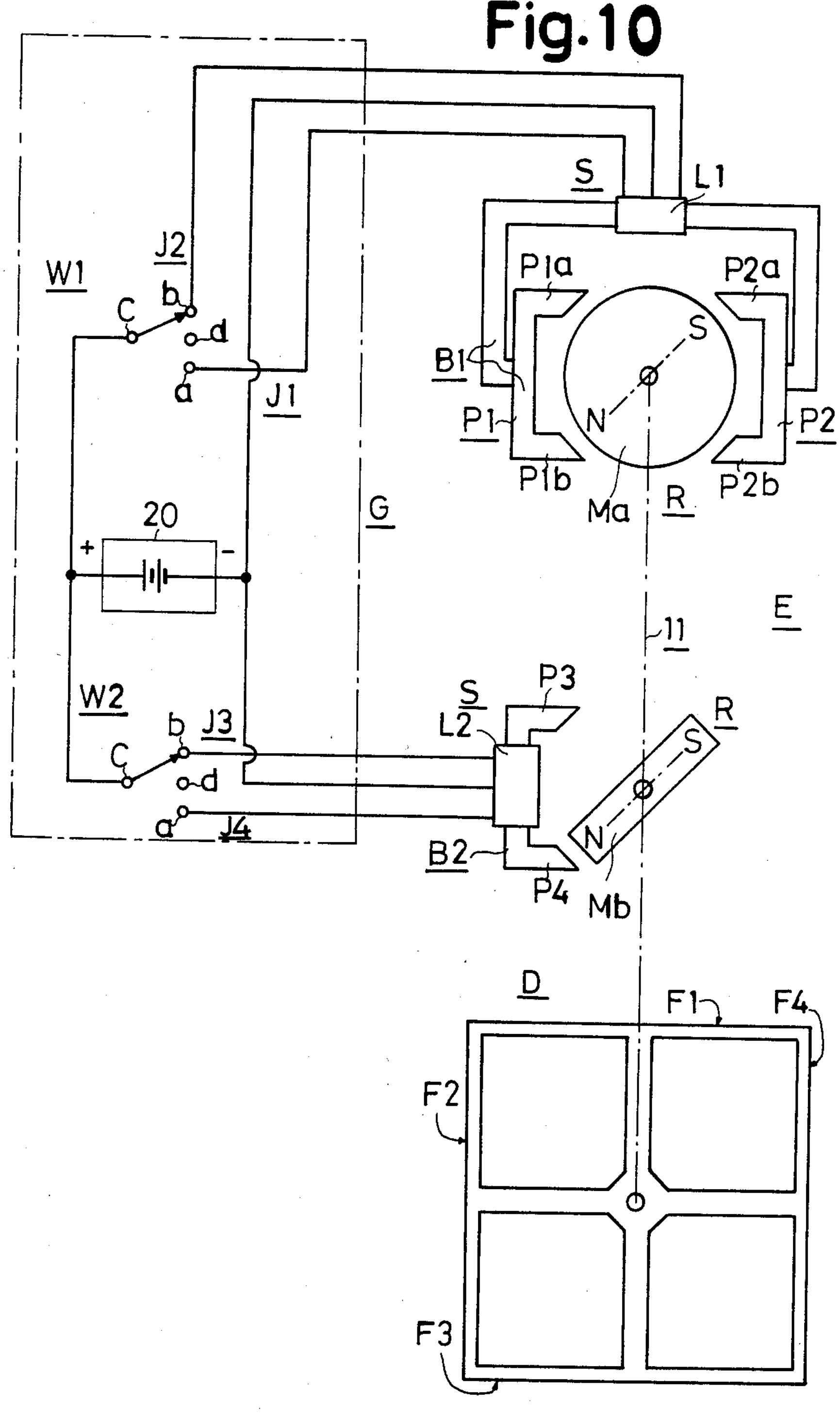
Figure 11:
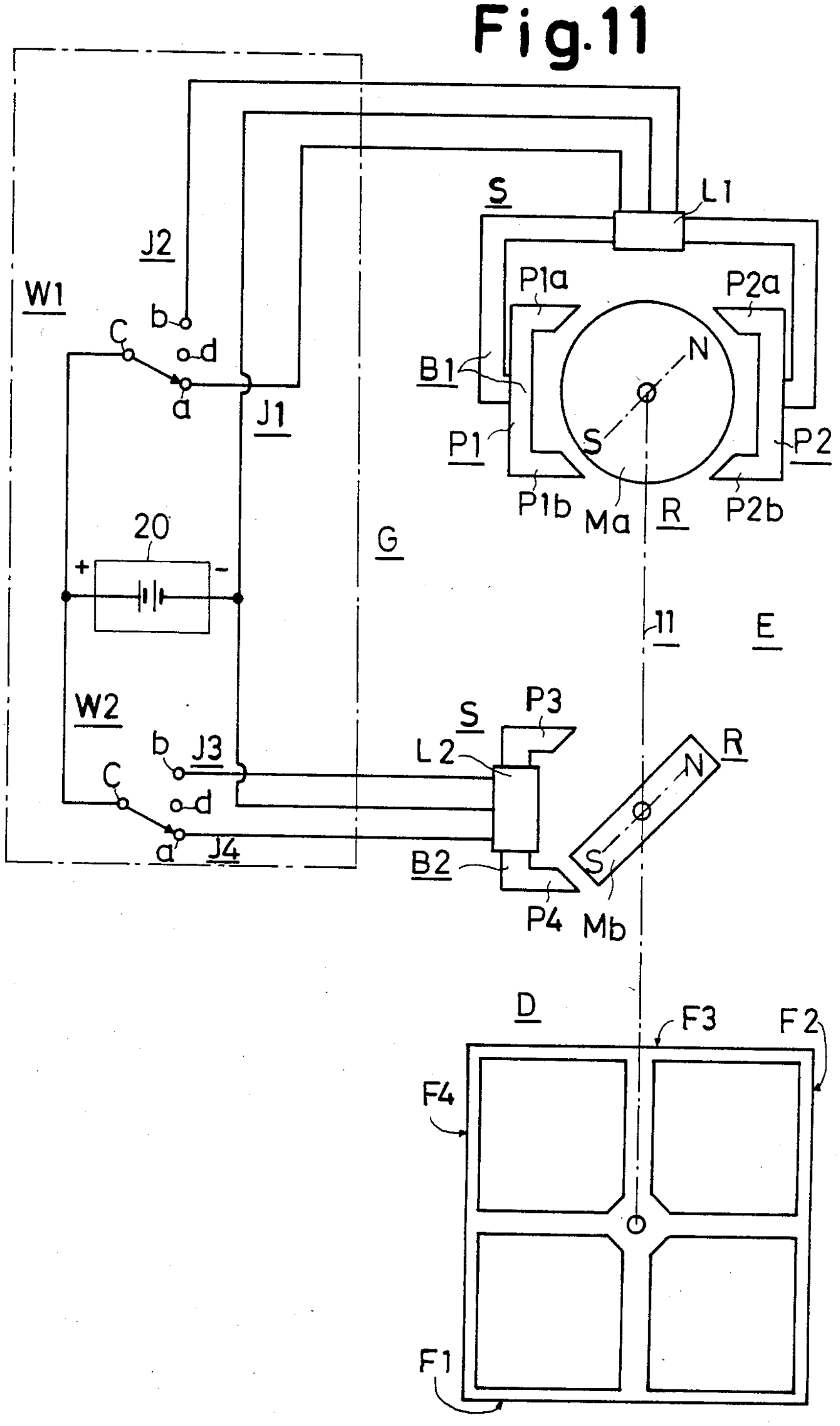
Figure 12:
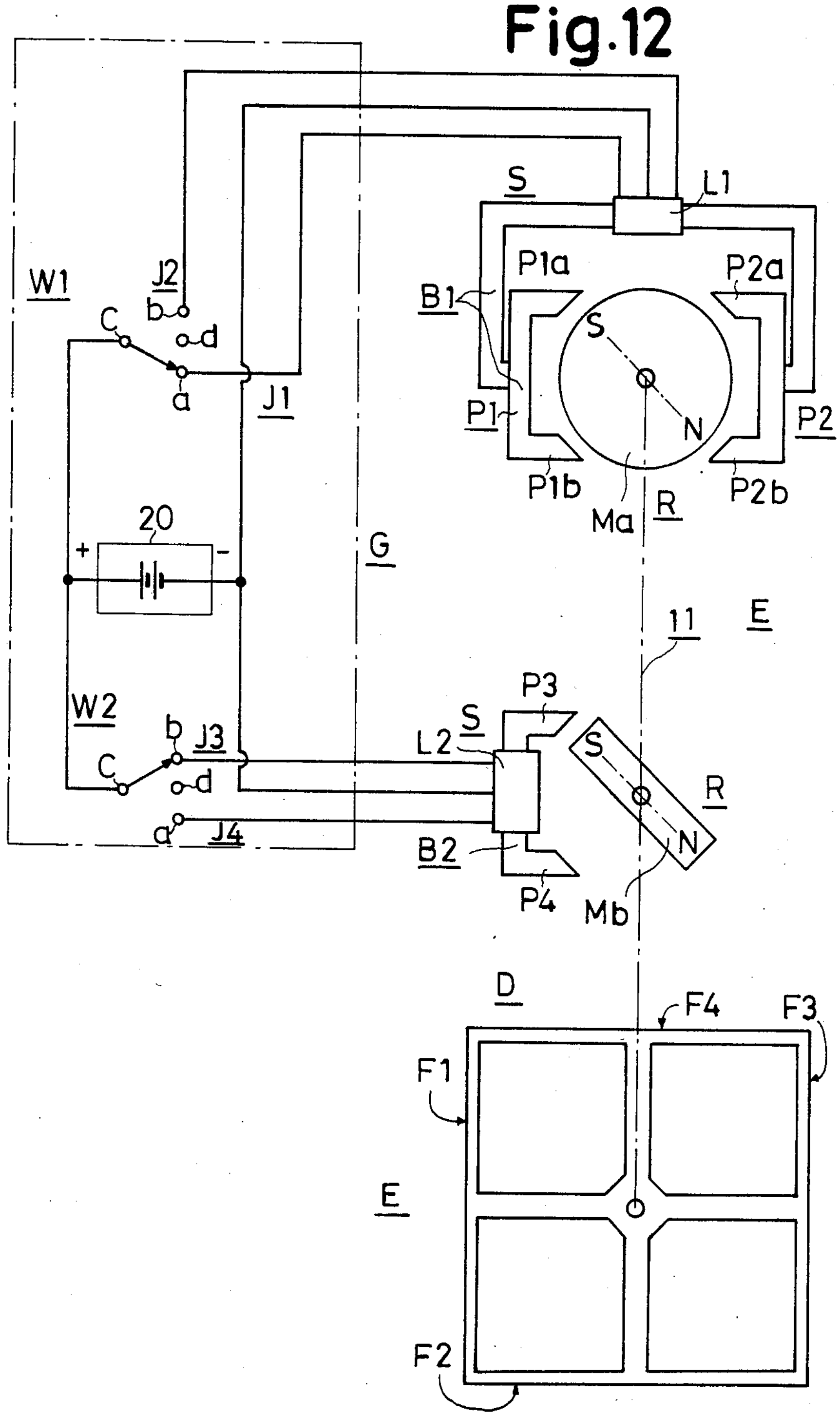

In this case, the display surface structure D is mounted on the rotor R in such a manner that, as shown in FIGS. 5 and 9, the display surface F1 of the display surface structure D faces the front when the rotor R assumes such a first rotational position where the north and south magnetic poles of the double-pole permanent magnet Ma are opposite to the magnetic pole portions P1*a* and P2*b* of the magnetic member B1, respectively, and the north magnetic pole of the double-pole permanent magnet Mb is opposite to the magnetic pole P3 of the magnetic member B2. As shown in FIGS. 6 and 10, the display surface F4 of the display surface structure D faces the front when the rotor R assumes such a fourth rotational position where the north and south magnetic poles of the double-pole permanent magnet Ma confront the magnetic pole portions P1*b* and P2*a* of the magnetic member B1, respectively, and the north magnetic pole of the double-pole permanent magnet Mb confronts the magnetic pole portion P4 of the magnetic member B2. As shown in FIGS. 7 and 11, the display surface F2 faces the front when the rotor R assumes such a second rotational position where the north and south magnetic poles of the double-pole permanent magnet Ma are opposite to the magnetic pole portions P2*a* and P1*b* of the magnetic member B2, respectively, and the south magnetic pole of the double-pole permanent magnet member Mb is opposite to the magnetic pole portion P4 of the magnetic member B2. Furthermore, as shown in FIGS. 8 and 12, the display surface F3 faces the front when the rotor R assumes such a third rotational position where the north and south magnetic poles of the double-pole permanent magnet Ma confront the magnetic pole portions P2*b* and P1*a* of the magnetic member B1, respectively, and the south magnetic pole of the double-pole permanent magnet Mb confronts the magnetic pole portion P3 of the magnetic member B2.

As illustrated in FIGS. 5 to 12, the driving device G is provided with power supply means J1 for supplying power to the exciting winding L1 so that the magnetic poles P1 (P1*a* and P1*b*) and P2 (P2*a* and P2*b*) of the magnetic member B1 are magnetized with north and south magnetic poles, respectively, power supply means J2 for supplying power to the exciting winding L1 so that the magnetic poles P1 (P1*a* and P1*b*) and P2 (P2*a* and P2*b*) of the magnetic member B1 are magnetized with south and north magnetic poles, respectively, power supply means J3 for supplying power to the exciting winding L2 so that the magnetic poles P3 and P4 of the magnetic member B2 are magnetized with north and south magnetic poles, respectively, and power supply means J4 for supplying power to the exciting winding L2 so that the magnetic poles P3 and P4 of the magnetic member B2 are magnetized with south and north magnetic poles, respectively.

The power supply means J1 has, for instance, such an arrangement that a DC power source 20 is connected at the positive side to one end of the exciting winding L1 via a movable contact c and a fixed contact a of a change-over switch W1 and connected at the negative side to the mid point of the exciting winding L1 directly.

The power supply means J2 has, for example, such an arrangement that the DC power source 20 is connected at the positive side to the other end of the exciting winding L1 via the movable contact c and the other fixed contact b of the change-over switch W1 and connected at the negative side to the mid point of the exciting winding L1.

The power supply means J3 has, for instance, such an arrangement that the DC power source 20 is connected at the positive side to one end of the exciting winding L2 via a movable contact c and a fixed contact b of a change-over switch W2 and connected at the negative side to the mid point of the exciting winding L2 directly.

The power supply means J4 has, for example, such an arrangement that the DC power source 20 is connected at the positive side to the other end of the exciting winding L2 via the movable contact c and the other fixed contact a of the change-over switch W2 and connected at the negative side to the mid point of the exciting winding L2.

The foregoing is a description of the arrangement of an embodiment of the display unit employing the rotating display element according to the present invention. Next, a description will be given of details of the arrangement and its operation.

With such an arrangement as described in the foregoing, the rotor R of the motor mechanism Q has the double-pole permanent magnet member M comprising the two double-pole permanent magnets Ma and Mb mounted on the rotary shaft 11. The north magnetic poles of the double-pole permanent magnets Ma and Mb lie at the same rotational angular position around the rotary shaft 11, and the south magnetic poles of the both permanent magnets Ma and Mb lie at the same rotational angular position spaced an angular distance of 180° from the north magnetic poles. On the other hand, the stator S of the motor mechanism Q has the magnetic member B1 which is provided with the magnetic poles P1 and P2 spaced a 180° angular distance apart around the rotary shaft 11, for acting on the north and south magnetic poles of the double-pole permanent magnet Ma, and the magnetic member B2 which has the magnetic poles P3 and P4 disposed at 90° intervals around the rotary shaft 11, for acting on the north and south magnetic poles of the double-pole permanent magnet Mb. The magnetic pole P1 of the magnetic member B1 comprises the magnetic pole portions P1*a* and P1*b* disposed at 90° intervals around the rotary shaft 11, and the magnetic pole P2 comprises the magnetic pole portions P2*a* and P2*b* similarly disposed at 90° intervals around the rotary shaft 11.

With such an arrangement, in the case where the movable contacts c of the change-over switch W1 and W2 are connected to the fixed contacts d which are not connected to the exciting windings L1 and L2 and, consequently, neither of the exciting windings L1 and L2 of the stator S is supplied with power, the rotor R of the motor mechanism Q assumes the aforementioned first rotational position where the north and south magnetic poles of the double-pole permanent magnet Ma are opposite to the magnetic pole portions P1*a* and P2*b* of the magnetic member B2, respectively, and the north magnetic pole of the double-pole permanent magnet Mb is opposite to the magnetic pole P3 of the magnetic member B2 as illustrated in FIG. 5, the fourth rotational position where the north and south magnetic poles of the double-pole permanent magnet Ma are opposite to the magnetic pole portions P1*b* and P2*a* of the magnetic member B1, respectively, and the north magnetic pole of the double-pole permanent magnet Mb is opposite to the magnetic pole portion P4 of the magnetic member B2 as shown in FIG. 6, the second rotational position where the north and south magnetic poles of the double-pole permanent magnet Ma are opposite to the magnetic pole portions P2*a* and P1*b* of the magnetic member B1, respectively, and the south magnetic pole of the double-pole permanent magnet Mb is opposite to the magnetic pole portion P4 of the magnetic member B2 as shown in FIG. 7, or the third rotational position where the north and south magnetic poles of the double-pole permanent Ma are opposite to the magnetic pole portions P2*b* and P1*a* of the magnetic member B1, respectively, and the south magnetic pole of the double-pole permanent magnet Mb is opposite to the magnetic pole portion P3 of the magnetic member B2 as illustrated in FIG. 8.

Furthermore, as described previously, the display surface structure D is mounted on the rotor R so that the display surfaces F1 to F4 respectively face the front when the rotor R assumes the abovesaid rotational positions.

Now, let it be assumed that the display element E is in such a first state that the rotor R of the motor mechanism Q lies at the first rotational position and, consequently, the display surface F1 faces the front. In this case, if the power source 20 is connected via the power supply means J2 to the exciting winding L1 and then connected via the power supply means J4 to the exciting winding L2 as shown in FIG. 9, the display element E is retained in the first state for the reason given below.

That is to say, by the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively, but, in this case, since the north and south magnetic poles of the double-pole permanent magnet Ma are opposite to the magnetic pole portions P1*a* and P2*b*, respectively, no torque is produced in the double-pole permanent magnet Ma. And by the power supply to the exciting winding L2 via the power supply means J4, the magnetic poles P3 and P4 of the magnetic member B2 are magnetized with south and north magnetic poles, respectively, but, in this case, no torque is produced in the double-pole permanent magnet Mb, either, since the north magnetic pole of the double-pole permanent magnet Mb is opposite to the magnetic pole P3.

In the case where the display element E is in the above-mentioned first state as shown in FIG. 5, if the power source is connected via the power supply means J2 to the exciting winding L1 and then connected via the power supply means J3 to the exciting winding L2 as shown in FIG. 10, the rotor R of the motor mechanism Q assumes the aforesaid fourth rotational position and, as a result of this, the display element E is changed over from the first state to a fourth state in which the display surface F4 faces the front.

The reason is as follows: By the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively, but, in this case, no torque is generated in the double-pole permanent magnet Ma since the north and south magnetic poles of the double-pole permanent magnet Ma confront the magnetic pole portions P1*a* and P2*b*, respectively. By the power supply to the exciting winding L2 via the power supply means J3, however, the magnetic poles P3 and P4 of the magnetic member B2 are magnetized with north and south magentic poles and, in this case, since the north magnetic pole of the double-pole permanent magnet Mb confronts the magnetic pole P3, counterclockwise torque is produced in the double-pole permanent magnet Mb to turn it counterclockwise, together with the double-pole permanent magnet Ma.

In consequence, the north and south magnetic poles of the double-pole permanent magnet Ma are moved into opposing relation to the magnetic pole portions P1*b* and P2*a* of the magnetic member B1 now acting as the south and north magnetic poles, respectively, and the north magnetic pole of the double-pole permanent magnet Mb is brought into opposing relation to the magnetic pole P4 of the magnetic member B2 now serving as the south magnetic pole. Once the display element E is brought into such a state, torque is no longer produced in the double-pole permanent magnets Ma and Mb.

In the case where the display element E is in the aforementioned first state shown in FIG. 5, if the power source is connected via the power supply means J1 to the exciting winding L1 and then connected via the power supply means J4 to the exciting winding L2 as shown in FIG. 11, the rotor R of the motor mechanism Q assumes the aforesaid second rotational position and, as a result of this, the display element E is changed over from the first state to a second state in which the display surface F2 faces the front.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, since the north and south magnetic poles of the double-pole permanent magnet Ma confront the magnetic pole portions P1*a* and P2*b*, clockwise torque is generated in the double-pole permanent magnet Ma to turn it clockwise, along with the double-pole permanent magnet Mb. In consequence, the north and south magnetic poles of the double-pole permanent magnet Ma are turned into opposing relation to the magnetic pole portions P2*a* and P1*b* of the magnetic member B1 now serving as the south and north magnetic poles, respectively, and the south magnetic pole of the double-pole permanent magnet Mb is turned into opposing relation to the magnetic pole P4 of the magnetic member B2. Then, by the power supply to the exciting winding L2 via the power supply means J4, the magnetic poles P3 and P4 are magnetized with south and north magnetic poles. In this case, since the south magnetic pole of the double-pole permanent magnet Mb lies opposite to the magnetic pole P4, no torque is generated in the double-pole permanent magnet Mb. After all, the north and south magnetic poles of the double-pole permanent magnet Ma are opposite to the magnetic pole portions P2*a* and P1*b* of the magnetic member B1 now acting as the south and north magnetic poles, respectively, and the south magnetic pole of the double-pole permanent magnet Mb is opposite to the magnetic pole P4 of the magnetic member B2 now serving as the north magnetic pole. Once the display element E is brought into such a state, torque is no longer generated in either of the double-pole permanent magnets Ma and Mb.

In the first state of the display element E, shown in FIG. 5, if the power source is connected via the power supply means J1 to the exciting winding L1 and then connected via the power supply means J3 to the exciting winding L2 as shown in FIG. 12, the rotor R of the motor mechanism Q assumes the aforementioned third rotational position, resulting in the display element E being changed over from the first state to a third state in which the display surface F3 faces the front.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, since the north and south magnetic poles of the double-pole permanent magnet Ma lie in opposing relation to the magnetic pole portions P1*a* and P2*b*, respectively, clockwise torque is produced in the double-pole permanent magnet Ma to turn it clockwise, along with the double-pole permanent magnet Mb. In consequence, the north and south magnetic poles of the double-pole permanent magnet Ma are moved into opposing relation to the magnetic pole portions P2*a* and P1*b* of the magnetic member B1 now acting as the south and north magnetic poles, respectively, and the south magnetic pole of the double-pole permanent magnet Mb is moved into opposing relation to the magnetic pole P4 of the magnetic member B2. Then, by the power supply to the exciting winding L2 via the power supply means J3, the magnetic poles P3 and P4 of the magnetic member B2 are magnetized with north and south magnetic poles, respectively, In this case, since the south magnetic pole of the double-pole permanent magnet Mb lies opposite to the magnetic pole P4, clockwise torque is generated in the double-pole permanent magnet Mb to turn it clockwise, along with the double-pole permanent magnet Ma. In consequence, the north and south magnetic poles of the double-pole permanent magnet Ma are turned into opposing relation to the magnetic pole portions P2*b* and P1*a* of the magnetic member B1 now acting as the south and north magnetic poles, respectively, and the south magnetic pole of the double-pole permanent magnet Mb is turned into opposing relation to the magnetic pole P3 of the magnetic member B2 now serving as the north magnetic pole. Once the display element E is brought into such a state, no torque is no longer is produced in either of the double-pole permanent magnets Ma and Mb.

Now, let it be assumed that the display element E is held in the aforesaid fourth state shown in FIG. 6 in which the rotor R of the motor mechanism Q assumes the fourth rotational position where the display surface F4 of the display surface structure D faces the front. In this case, the display element E is retained in the fourth state by connecting the power source to the exciting winding L1 via the power supply means J2 and then to the exciting winding L2 via the power supply means J3 as shown in FIG. 10.

The reason is as follows: By the power supply to the exciting winding L1 via the power supply means J2, the magnetic poles P1 (the magnetic pole portions P2*a* and P2*b*) and P2 (the magnetic pole portions P2*a* and P2*b*) of the magnetic member B1 are magnetized with south and north magnetic poles, respectively. In this case, since the north and south magnetic poles of the double-pole permanent magnet Ma lie opposite to the magnetic pole portions P1*b* and P2*a*, respectively, no torque is generated in the double-pole permanent magnet Ma. Then, by the power supply to the exciting winding L2 via the power supply means J3, the magnetic poles P3 and P4 of the magnetic member B2 are magnetized with north and south magnetic poles, respectively, but, in this case, since the north magnetic pole of the double-pole permanent magnet Mb is opposite to the magnetic pole P4, torque is not produced in the double-pole permanent magnet Mb, either.

In the fourth state of the display element E, shown in FIG. 6, if the power source is connected via the power supply means J2 to the exciting winding L1 and then to the exciting winding L2 via the power supply means J4 as shown in FIG. 9, the rotor R of the motor mechanism Q assumes the first rotational position, by which the display element E is changed over from the fourth state to the first state in which the display surface F1 faces the front, and retained in this state.

The reason is as follows: By the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively. In this case, since the north and south magnetic poles of the double-pole permanent magnet Ma lie opposite to the magnetic pole portions P1*b* and P2*a*, respectively, not torque is generated in the double-pole permanent magnet Ma. By the power supply to the exciting winding L2 via the power source means J4 however, the magnetic poles P3 and P4 of the magnetic member B2 are magnetized with south and north magnetic poles, respectively. And, in this case, since the north magnetic pole of the double-pole permanent magnet Mb lies opposite to the magnetic pole P4, clockwise torque is generated in the double-pole permanent magnet Mb to turn it clockwise, along with the double-pole permanent magnet Ma. In consequence, the north and south magnetic poles of the double-pole permanent magnet Ma are brought into opposing relation to the magnetic pole portions P1*a* and P2*b* of the magnetic member B1 now serving as the south and north magnetic poles, respectively, and the north magnetic pole of the double-pole permanent magnet Mb is brought into opposing relation to the magnetic pole P3 of the magnetic member B2 now serving as the south magnetic pole. Once the display element E is brought into such a state, torque is no longer produced in either of the double-pole permanent magnets Ma and Mb.

In the fourth state of the display element E, shown in FIG. 6, if the power source is connected to the exciting winding L1 via the power supply means J1 and then to the exciting winding L2 via the power supply means J4 as shown in FIG. 11, the rotor R of the motor mechanism Q assumes the second rotational position and, as a result of this, the display element E is changed over from the fourth state to the second state in which the display surface F2 faces the front, and held in this state.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, since the north and south magnetic poles of the double-pole permanent magnet Ma lie opposite to the magnetic pole portions P1*b* and P2*a*, counterclockwise torque is produced in the double-pole permanent magnet Ma to turn it counterclockwise, along with the double-pole permanent magnet Mb. In consequence, the north and south magnetic poles of the double-pole permanent magnet Ma are moved into opposing relation to the magnetic pole portions P2*b* and P1*a* of the magnetic member B1 now serving as the south and north magnetic poles, respectively, and the south magnetic pole of the double-pole permanent magnet Mb is moved into opposing relation to the magnetic pole P3 of the magnetic member B2. Then, by the power supply to the exciting winding L2 via the power supply means J4, the magnetic poles P3 and P4 of the magnetic member B2 are magnetized with south and north magnetic poles, respectively. And, in this case, since the south magnetic pole of the double pole permanent magnet Mb lies opposite to the magnetic pole P3, counterclockwise torque is produced in the double-pole permanent magnet Mb to turn it counterclockwise, along with the double-pole permanent magnet Ma. In consequence, the north and south magnetic poles of the double-pole permanent magnet Ma are brought into opposing relation to the magnetic pole portions P2*a* and P1*b* of the magnetic member B1 now acting as the south and north magnetic poles, respectively, and the south magnetic pole of the double-pole permanent magnet Mb is brought into opposing relation to the magnetic pole P4 of the magnetic member B2 now acting as the north magnetic pole. And once the display element E is brought into such a state, the torque is no longer produced in either of the double-pole permanent magnets Ma and Mb.

In the fourth state of the display element E, shown in FIG. 6, if the power source is connected to the exciting winding L1 via the power supply means J1 and then to the exciting winding L2 via the power supply means J3 as shown in FIG. 12, the rotor R of the motor mechanism Q assumes the third rotational position and, as a result of this, the display element E is changed over from the fourth state to the third state in which the display surface F3 faces the front, and retained in this state.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, since the north and south magnetic poles of the double-pole permanent magnet Ma lie opposite to the magnetic pole portions P1*b* and P2*a*, respectively, counterclockwise torque is generated in the double-pole permanent magent Ma to turn it counterclockwise, along with the double-pole permanent magnet Mb. In consequence, the north and south magnetic poles of the double-pole permanent magnet Ma are brought into opposing relation to the magnetic pole portions P2*b* and P1*a* of the magnetic member B1 now functioning as the south and norht magnetic poles, respectively, and the south magnetic pole of the double-pole permanent magnet Mb is brought into opposing relation to the magnetic pole P3 of the magnetic member B2. Then, by the power supply to the exciting widing L2 via the power supply means J3, the magnetic poles P3 and P4 of the magnetic member B2 are magnetized with north and south magnetic poles, respectively. And, in this case, since the south magnetic pole of the double-pole permanent magnet Mb lies opposite to the magnetic pole P3, no torque is generated in the double-pole permanent magnet Mb. After all, the north and south magnetic poles of the double-pole permanent magnet Ma lie opposite to the magnetic pole portions P2*b* and P1*a* of the magnetic member B1 acting as the south and north magnetic poles, respectively, and the south magnetic pole of the double-pole permanent magnet Mb lies opposite to the magnetic pole P3 of the magnetic member B2 acting as the north magnetic pole. Once the display element E is brought into such a state, torque is no longer produced in either of the double-pole permanent magnets Ma and Mb.

Now, let it be assumed that the display element E is held in the aforesaid second state shown in FIG. 7 in which the rotor R of the motor mechanism Q assumes the second rotational position where the display surface F2 of the display surface structure D faces the front. In this case, the display element E is retained in the second state by connecting the power source to the exciting winding L1 via the power supply means J2 and to the exciting winding L2 via the power supply means J4 as shown in FIG. 11.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, however, since, the north and south magnetic poles of the double-pole permanent magnet Ma lie opposite to the magnetic pole portions P2*a* and P1*b*, respectively, no torque is generated in the double-pole permanent magnet Ma. Then, by the power supply to the exciting winding L2 via the power supply means J4, the magnetic poles P3 and P4 of the magnetic member B2 are magnetized with south and north magnetic poles, respectively. In this case, however, since the south magnetic pole of the double-pole permanent magnet Mb lies opposite to the magnetic pole P4, torque is not generated in the double-pole permanent magnet Mb, either.

In the second state of the display element E, shown in FIG. 7, if the power source is connected to the exciting winding L1 via the power supply means J2 and then to the exciting winding L2 via the power supply means J4 as shown in FIG. 9, the rotor R of the motor mechanism Q assumes the aforementioned first rotational position and, as a result of this, the display element E is changed over from the second state to the first state in which the display surface F1 faces the front, and retained in this state.

The reason is as follows: By the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively. And, in this case, since the north and south magnetic poles of the double-pole permanent magnet Ma lie opposite to the magnetic pole portions P2*a* and P1*b*, respectively, counterclockwise torque is generated in the double-pole permanent magnet Ma to turn it counterclockwise, along with the double-pole permanent magnet Mb. In consequence, the north and south magnetic poles of the double-pole permanent magnet Ma are turned into opposing relation to the magnetic pole portions P1*a* and P2*b* of the magnetic member B1, respectively, and the north magnetic pole of the double-pole permanent magnet Mb is brought into opposing relation to the magnetic pole P3 of the magnetic member B2. Then, by the power supply to the exciting winding L2 via the power supply means J4, the magnetic poles P3 and P4 of the magnetic member B2 are magnetized with south and north magnetic poles, respectively. And, in this case, since the north magnetic pole of the double-pole permanent magnet Mb lies opposite to the magnetic pole P3, no torque is generated in the double-pole permanent magnet Mb. After all, the north and south magnetic poles of the double-pole permanent magnet Ma are moved into opposing relation to the magnetic pole portions P1*a* and P2*b* of the magnetic member B1 now serving as the south and north magnetic poles, respectively, and the north magnetic pole of the double-pole permanent magnet Mb is moved into opposing relation to the magnetic pole P3. Once the display element E is brought into such a state, torque is no longer produced in either of the double-pole permanent magnets Ma and Mb.

In the second state of the display element E, shown in FIG. 7, if the power source is connected to the exciting winding L1 via the power supply means J2, and then to the exciting winding L2 via the power supply means J3 as shown in FIG. 10, the rotor R of the motor mechanism Q assumes the aforementioned fourth rotational position and, as a result of this, the display element E is changed over from the second state to the fourth state in which the display surface F4 faces the front, and held in this state.

The reason is as follows: By the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively. In this case, however, since the south and north magnetic poles of the double-pole permanent magnet Ma lie opposite to the magnetic pole portions P1*b* and P2*a*, respectively, counterclockwise torque is generated in the double-pole permanent magnet Ma to turn it counterclockwise, along with the double-pole permanent magnet Mb, by which the north and south magnetic poles of the double-pole permanent magnet Ma are brought into opposing relation to the magnetic pole portions P1*a* and P2*b* of the magnetic member B1 now serving as the south and north magnetic poles, respectively, and the north magnetic pole of the double-pole permanent magnet Mb is brought into opposing relation to the magnetic pole P3 of the magnetic member B2. Then, by the power supply to the exciting winding L2 via the power supply means J3, the magnetic poles P3 and P4 of the magnetic member B2 are magnetized with north and south magnetic poles, respectively. And, in this case, since the north magnetic pole of the double-pole permanent magnet Mb lies opposite to the magnetic pole P3, counterclockwise torque is produced in the double-pole permanent magnet Mb to turn it counterclockwise, along with the double-pole permanent magnet Ma. In consequence, the north and south magnetic poles of the double-pole permanent magnet Ma are brought into opposing relation to the magnetic pole portions P1*b* and P2*a* now serving as the south and north magnetic poles, respectively, and the north magnetic pole of the double-pole permanent magnet Mb is brought into opposing relation to the magnetic pole P4 of the magnetic member B2 now serving as the south magnetic pole. And once the display element E is brought into such a state, torque is no longer generated in either of the double-pole permanent magnets Ma and Mb.

In the second state of the display element E, shown in FIG. 7, if the power source is connected to the exciting winding L1 via the power supply means J1 and then to the exciting winding L2 via the power supply means J3 as shown in FIG. 12, then the rotor R of the motor mechanism Q assumes the aforementioned third rotational position and, consequently, the display element E is changed over from the second state to the third state in which the display surface F3 faces the front, and retained in this state.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, however, since the north and south magnetic poles of the double-pole permanent magnet Ma lie opposite to the magnetic pole portions P2*a* and P1*b*, respectively, no torque is generated in the double-pole permanent magnet Ma. Then, by the power supply to the exciting winding L2 via the power supply means J3, however, the magnetic poles P3 and P4 of the magnetic member B2 are magnetized with north and south magnetic poles, respectively. And, in this case, since the south magnetic pole of the double-pole permanent magnet Mb lies opposite to the magnetic pole P4, clockwise torque is produced in the double-pole permanent magnet Mb to turn it clockwise, along with the double-pole permanent magnet Ma. In consequence, the north and south magnetic poles of the double-pole permanent magnet Ma are brought into opposing relation to the magnetic pole portions P2*b* and P1*a* of the magnetic member B1 now seving as the south and north magnetic poles, respectively, and the south magnetic pole of the double-pole permanent magnet Mb is brought into opposing relation to the magnetic pole P3 of the magnetic member B2 now serving as the north magnetic pole. And once the display element E is brought into such a state, torque is no longer genrated in either of the double-pole permanent magnets Ma and Mb.

Now, let it be assumed that the display element E is held in the aforesaid third state shown in FIG. 8 in which the rotor R of the motor mechanism Q assumes the third rotational position where the display surface F3 of the display surface structure D faces the front. In this case, the display element E is retained in the third state by connecting the power source to the exciting winding L1 via the power supply means J1 and then to the exciting winding L2 via the power supply means J3 as shown in FIG. 12.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, however, since the south and north magnetic poles of the double-pole permanent magnet Ma lie opposite to the magnetic pole portions P1*a* and P2*b*, respectively, no torque is produced in the double-pole permanent magnet Ma. Then, by the power supply to the exciting winding L2 via the power supply means J3, the magnetic poles P3 and P4 of the magnetic member B2 are magnetized with north and south magnetic poles, respectively. In this case, however, since the south magnetic pole of the double-pole permanent magnet Mb lies opposite to the magnetic pole P3, torque is not generated in the double-pole permanent magnet Mb, either.

In the third state of the display element E, shown in FIG. 8, if the power source is connected to the exciting winding L1 via the power supply means J2 and then to the exciting winding L2 via the power supply means J4 as shown in FIG. 9, then the rotor R of the motor mechanism Q assumes the first rotational position and, consequently, the display element E is changed over from the third state to the first state in which display surface F1 faces the front, and retained in this state.

The reason is as follows: By the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively. In this case, however, since the south and north magnetic poles of the double-pole permanent magnet Ma lie opposite to the magnetic pole portions P1*a* and P2*b*, respectively, clockwise torque is gnerated in the double-pole permanent magnet Ma to turn it clockwise, along with the double-pole permanent magnet Mb. In consequence, the north and south magnetic poles of the double-pole permanent magnet Ma are brought into oppositing relation to the magnetic pole portions P1*b* and P2*a* of the magnetic member B1 now serving as the south and north magnetic poles, respectively, and the north magnetic pole of the double-pole permanent magnet Mb is brought into opposing relation to the magnetic pole P4 of the magnetic member B2. Then, by the power supply to the exciting winding L2 via the power supply means J4, the magnetic poles P3 and P4 of the magnetic member B2 are magnetized with south and north magnetic poles, respectively. And, in this case, since the north magnetic pole of the double-pole permanent magnet Mb lies opposite to the magnetic pole P4, clockwise torque is generated in the double-pole permanent magnet Mb to turn it clockwise, along with the double-pole permanent magnet Ma. In consequence, the north and south magnetic poles of the double-pole permanent magnet Ma are brought into opposing relation to the magnetic pole portions P1*a* and P2*b* of the magnetic member B1 now serving as the south and north magnetic poles, respectively, and the north magnetic pole of the double-pole permanent magnet Mb is brought into opposing relation to the magnetic pole P3 of the magnetic member B2 now serving as the south magnetic pole. And once the display element E is brought into such a state, torque is no longer produced in either of the double-pole permanent magnets Ma and Mb.

In the third state of the display element E, shown in FIG. 8, if the power source is connected to the exciting winding L1 via the power supply means J2 and then to the exciting winding L2 via the power supply means J3 as shown in FIG. 10, then the rotor R of the motor mechanism Q assumes the aforementioned fourth rotational position and, consequently, the display element E is changed over from the third state to the fourth state in which the display surface F4 faces the front, and retained in this state.

The reason is as follows: By the power supply to the exciting winding L1 via the power supply means J2, the magnetic poles P1 (the magnetic pole portions P1*a* and P1*b*) and P2 (the magnetic pole portions P2*a* and P2*b*) of the magnetic member B1 are magnetized with south and north magnetic poles, respectively. And in this case, since the south and north magnetic poles of the double-pole permanent magnet Ma lie opposite to the magnetic pole portions P1*a* and P2*b*, respectively, clockwise torque is generated in the double-pole permanent magnet Ma to turn it clockwise, along with the double-pole permanent magnet Mb. In consequence, the north and south magnetic poles of the double-pole permanent magnet Ma are brought into opposing relation to the magnetic pole portions P1*b* and P2*a* of the magnetic member B1 now acting as south and north magnetic poles, respectively, and the north magnetic pole of the double-pole permanent magnet Mb is brought into opposing relation to the magnetic pole portion P4. Then, by the power supply to the exciting winding L2 via the power supply means J3, the magnetic poles P3 and P4 of the magnetic member B2 are magnetized with north and south magnetic poles, respectively. And, in this case, since the north magnetic pole of the double-pole permanent magnet Mb lies opposite to the magnetic pole P4, no torque is generated in the double-pole permanent magnet Mb. After all, the north and south magnetic poles of the double-pole permanent magnet Ma lie opposite to the magnetic pole portions P1*b* and P2*a* of the magnetic member B1 now acting as the south and north magnetic poles, respectively, and the north magnetic pole of the double-pole permanent magnet Mb is brought into opposing relation to the magnetic pole P3 of the magnetic member B2 now serving as the south magnetic pole. And once the display element E is brought into such a state, torque is no longer is produced in either of the double-pole permanent magnets Ma and Mb.

In the third state of the display element E, shown in FIG. 8, if the power source is connected to the exciting winding L1 via the power supply means J1 and then to the exciting winding L2 via the power supply means J4 as shown in FIG. 11, the rotor R of the motor mechanism Q assumes the aforementioned second rotational position and, consequently, the display element E is changed over from the third state to the second state in which the display surface F2 faces the front, and retained in this state.

The reason is as follows: By the power supply to the exciting winding L1 via the power supply means J1, the magnetic poles P1 (the magnetic pole portions P1*a* and P1*b*) and P2 (the magnetic pole portions P2*a* and P2*b*) of the magnetic member B1 are magnetized with north and south magnetic poles, respectively. In this case, however, since the north and south magnetic poles of the double-pole permanent magnet Ma lie opposite to the magnetic pole portions P1*a* and P2*b*, respectively, no torque is produced in the double-pole permanent magnet Ma. Then, by the power supply to the exciting winding L2 via the power supply means J4, however, the magnetic poles P3 and P4 of the magnetic member B2 are magnetized with south and north magnetic poles, respectively and, in this case, since the south magnetic pole of the double-pole permanent magnet Mb lies opposite to the magnetic pole P3, counterclockwise torque is produced in the double-pole permanent magnet Mb to turn it counterclockwise, along with the double-pole permanent magnet Ma. In consequence, the south and north magnetic poles of the double-pole permanent magnet Ma are brought into opposing relation to the magnetic pole portions P1*b* and P2*a* of the magnetic member B1 now acting as the south and north magnetic poles, respectively, and the south magnetic pole of the double-pole permanent magnet Mb is brought into opposing relation to the magnetic pole P4 of the magnetic member B2 now acting as the north magnetic pole. And once the display element E is brought into such a state, torque is no longer produced in either of the double-pole permanent magnets Ma and Mb.

The foregoing is a description of the arrangement of an embodiment of the display unit employing the rotating display element according to the present invention. With such an arrangement, as will be appreciated from the foregoing description, the display surfaces F1 to F4 of the display surface structure D forming the display element E can selectively be made to face the front by a simple operation of selecting the power supply to the exciting winding L1 via the power supply means J2 and then to the exciting winding L2 via the power supply means J4, the power supply to the exciting winding L1 via the power supply means J2 and then to the exciting winding L2 via the power supply means J3, the power supply to the exciting winding L1 via the power supply means J1 and then to the exciting winding L2 via the power supply means J4, and the power supply to the exciting winding L1 via the power supply means J1 and then to the exciting winding L2 via the power means J3.

In the cases where the display surfaces F1 to F4 of the display surface structure D are selected to face the front, even if the power supply to the exciting windings L1 and L2 of the stator S of the motor mechanism Q is OFF the display surfaces can be maintained in position without the necessity of providing any particular means therefore and no power consumption is involved therefore, since the north and south magnetic poles of the double-pole permanent magnet member M (comprising the double-pole permanent magnets Ma and Mb) of the rotor R of the motor mechanism Q act on the magnetic poles P1 (the magnetic pole portions P1*a* and P1*b*) and P2 (the magnetic pole portions P2*a* and P2*b*) of the magnetic member B1 of the stator S of the motor mechanism Q and the magnetic poles P3 and P4 of the magnetic member B2 of the stator S.

Since the motor mechanism Q for turning the display surface structure D is incorporated therein, a drive mechanism for turning the display surface structure D need not be provided separately of the display element E.

The means for selecting the display surfaces F1 to F4 of the display surface structure D of the display element E is very simple because it is formed by the power supply means J1 and J2 for the exciting winding L1 of the stator S forming the motor mechanism Q and the power supply means J3 and J4 for the exciting winding L2 of the stator S.

The foregoing description should be construed as merely illustrative of the present invention. The same results as those described in the foregoing can also be obtained by disposing the north magnetic poles of the double-pole permanent magnets Ma and Mb of the double-pole permanent magnet member M of the rotor R at different rotational angular positions around the rotary shaft 11 and disposing their south magnetic poles at different rotational angular positions around the rotary shaft 11 accordingly but maintaining unchanged the relationships of the north and south magnetic poles of the double-pole permanent magent Ma to the magnetic poles P1 (the magnetic pole portions P1*a* and P1*b*) and P2 (the magnetic pole portions P2*a* and P2*b*) of the magnetic member B1 of the stator S and the relationships of the north and south magnetic poles of the double-pole permanent magnet Mb to the magnetic poles P3 and P4 of the magnetic member B2 of the stator S.

Figure 13:
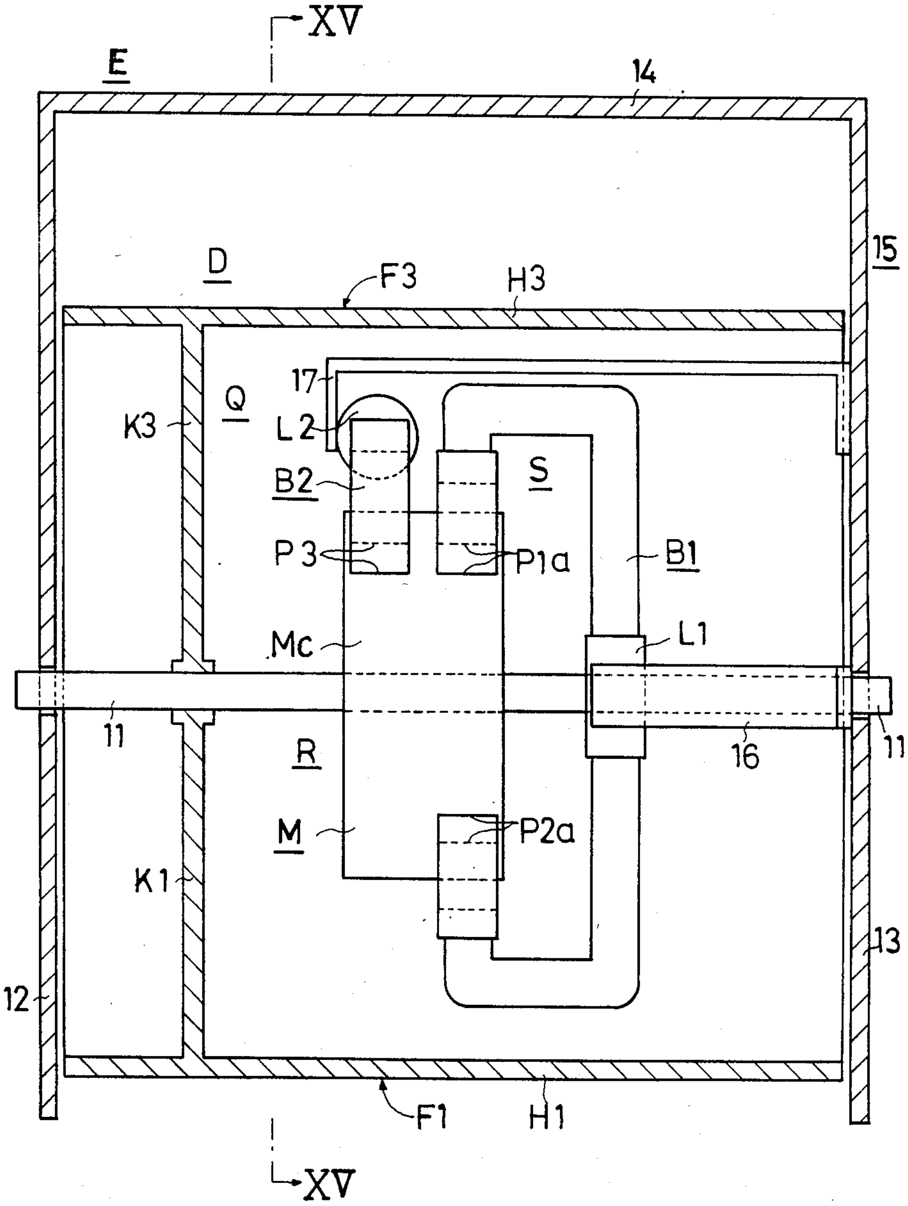
FIGS. 13 and 14 are a plan view and a front view, partly in section, illustrating another example of the rotating display element of the present invention.
Figure 14:
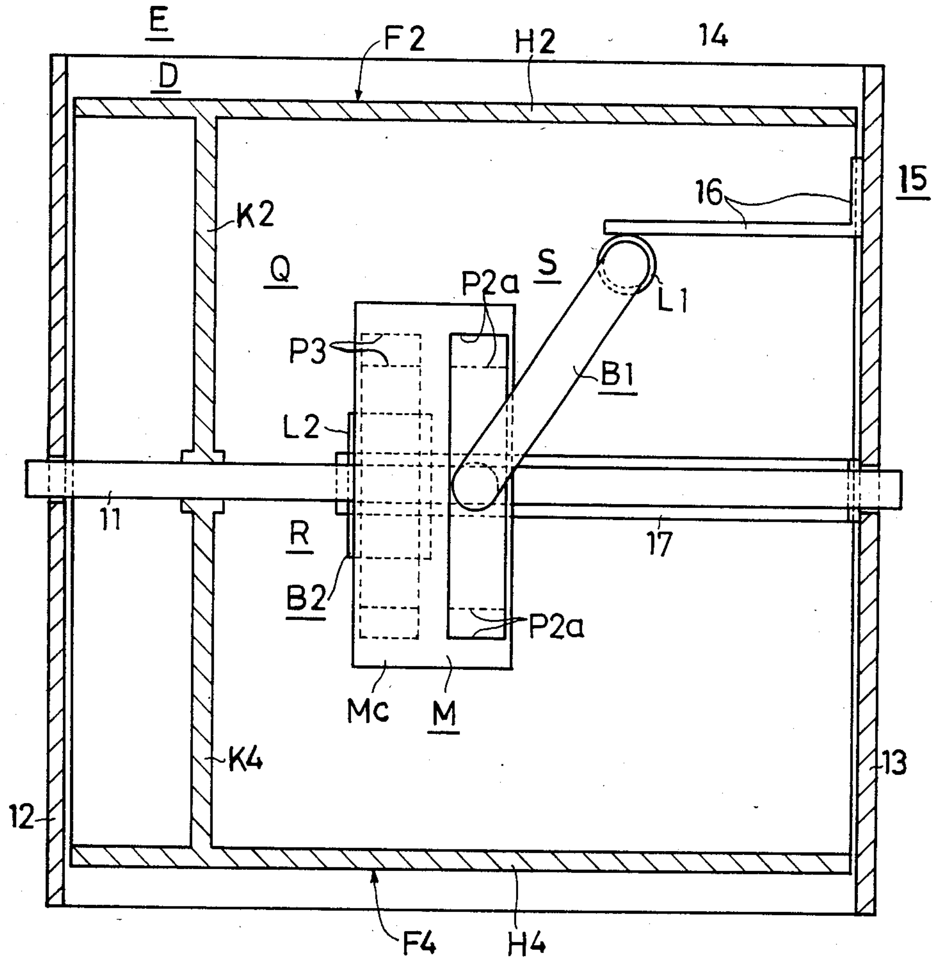
Figure 15:
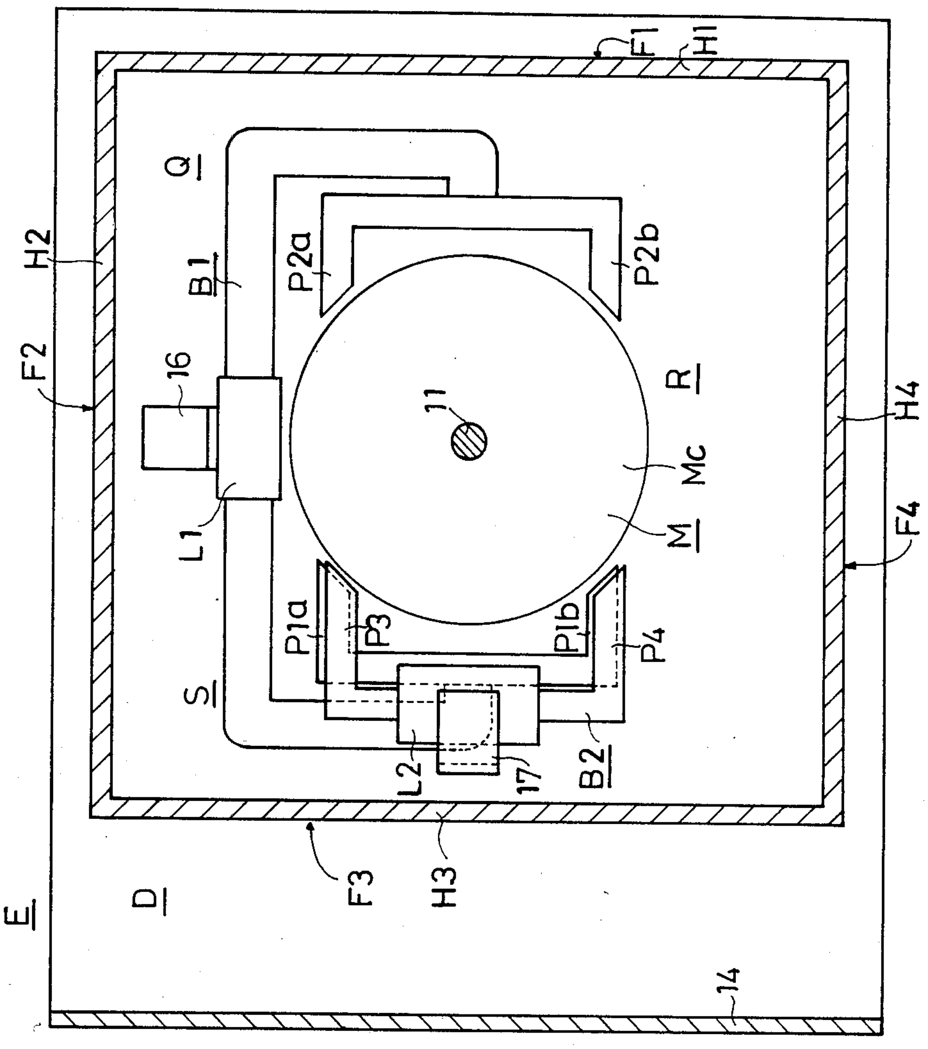
FIG. 15 is a side view, partly in section, as viewed from the line XV—XV in FIG. 13.

Furthermore, it is also possible to obtain the same results as described previously even if the double-pole permanent magnet member M is formed by one double-pole permanent magnet Mc instead of the two double-pole permanent magnets Ma and Mb as shown in FIGS. 13, 14 and 15 corresponding to FIGS. 2, 3 and 4 although no detailed description will be given.

Figure 16:
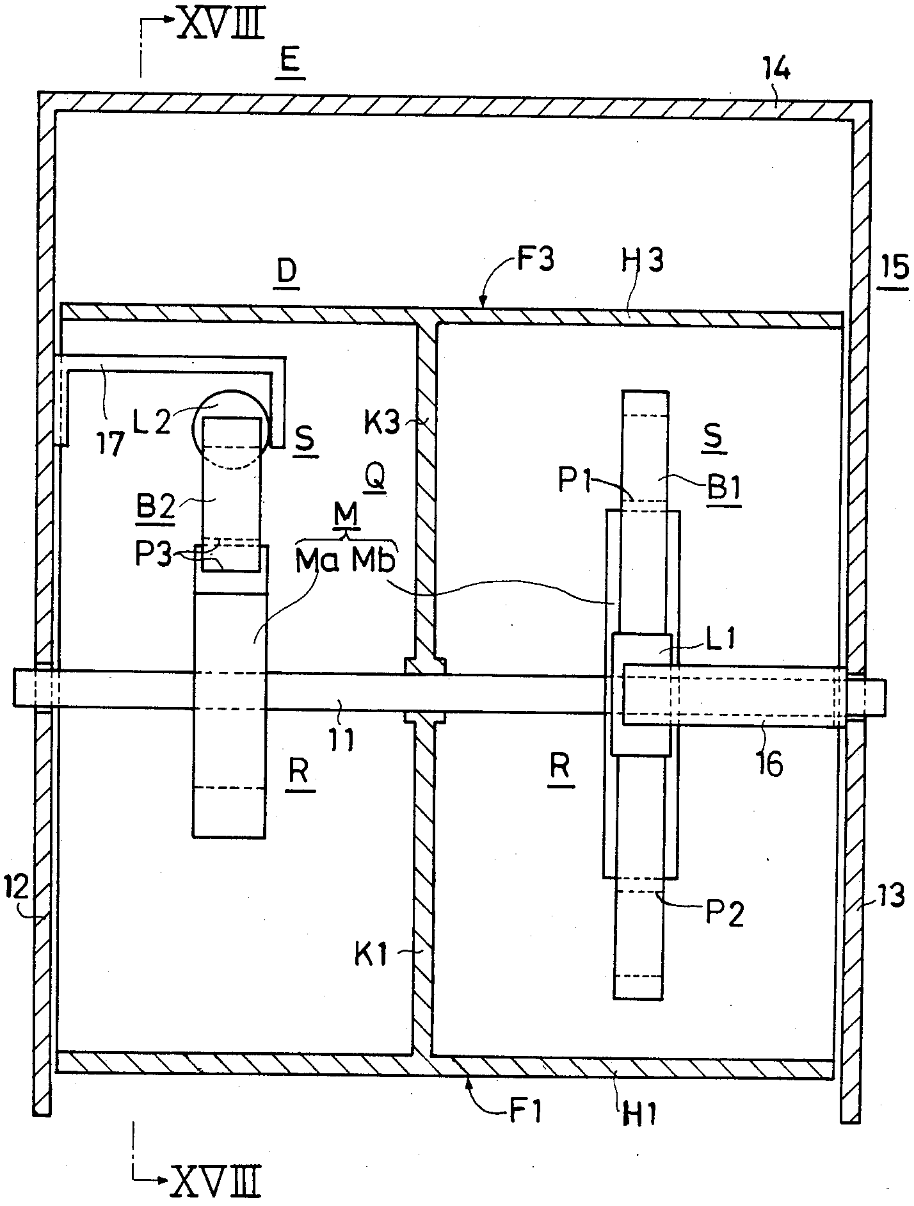
FIGS. 16 and 17 are a plan view and a front view, partly in section, illustrating another example of the rotating display element of the present invention.
Figure 17:
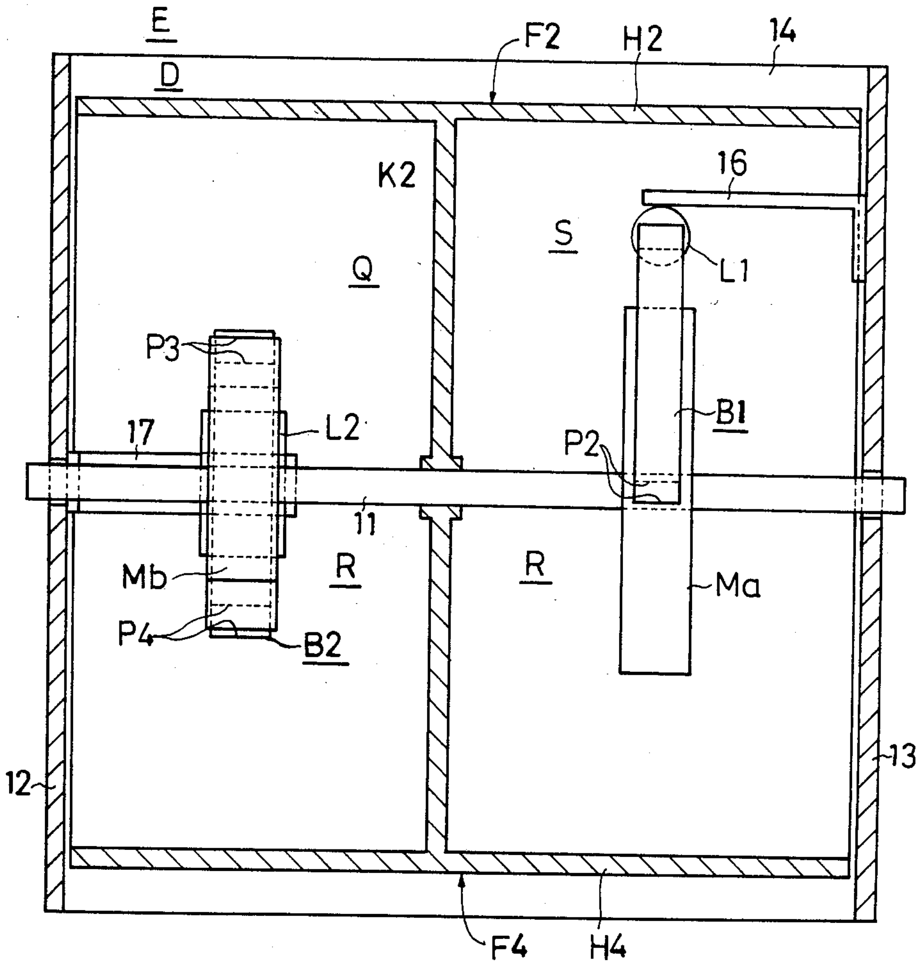
Figure 18:
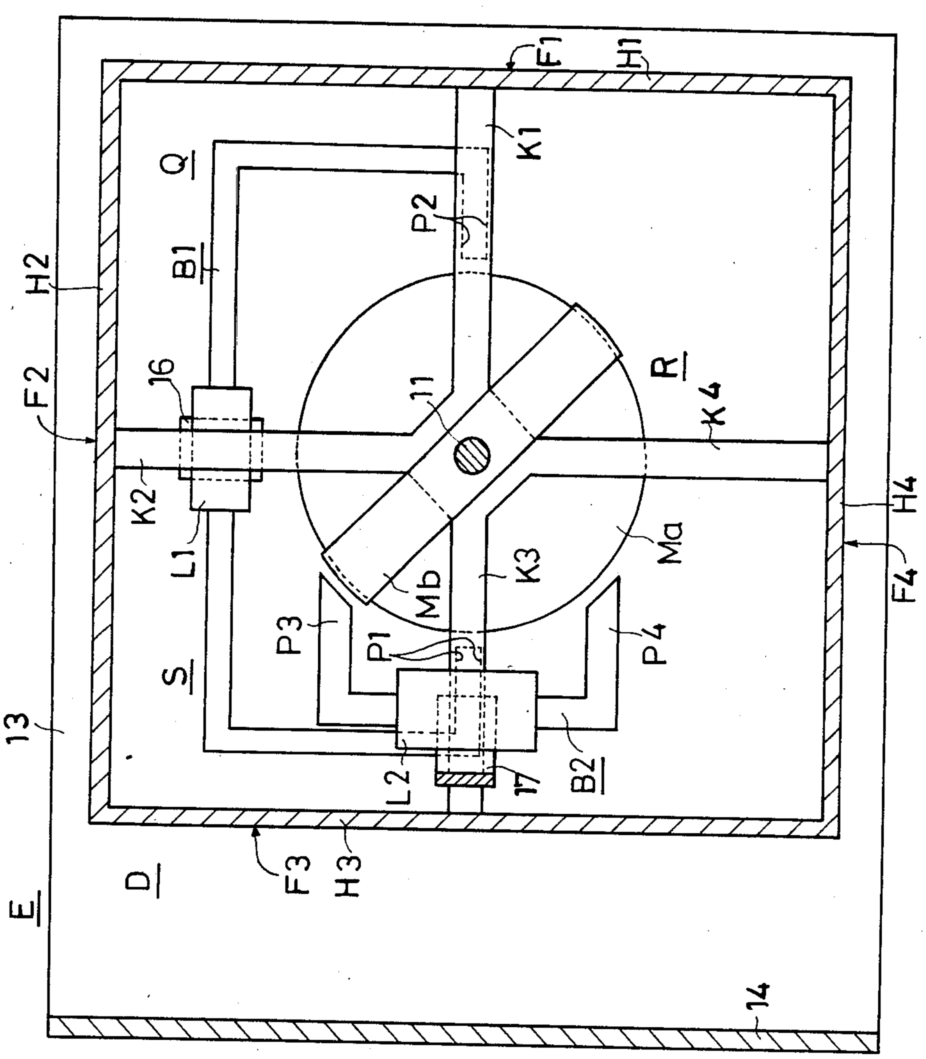
FIG. 18 is a side view, partly in section, as viewed from the line XVIII—XVIII in FIG. 16.
Figure 19:
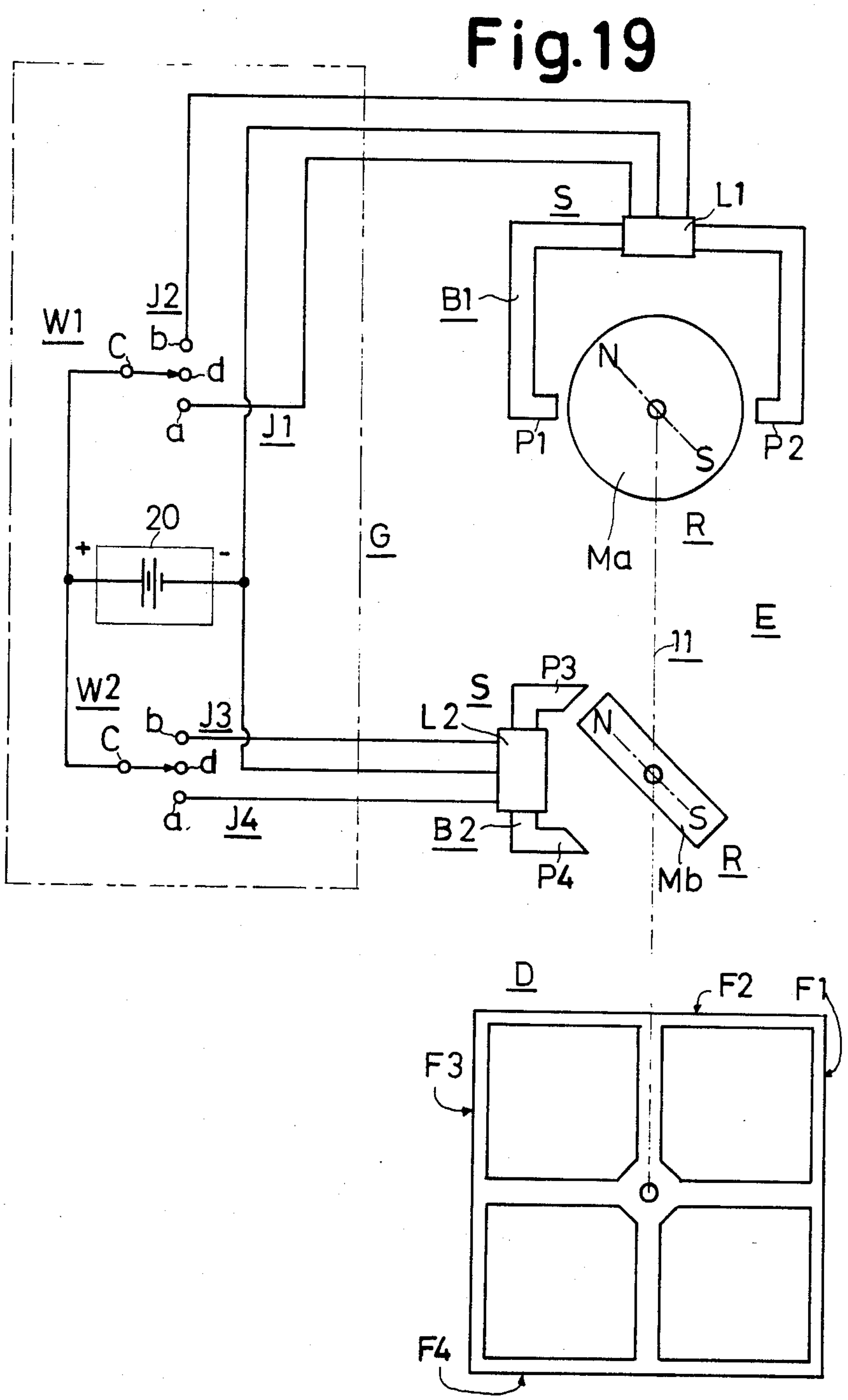
FIGS. 19 to 26, inclusive, are schematic diagrams illustrating the display unit of the present invention employing the rotating display element shown in FIGS. 16 through 18 and explanatory of its operation.
Figure 20:
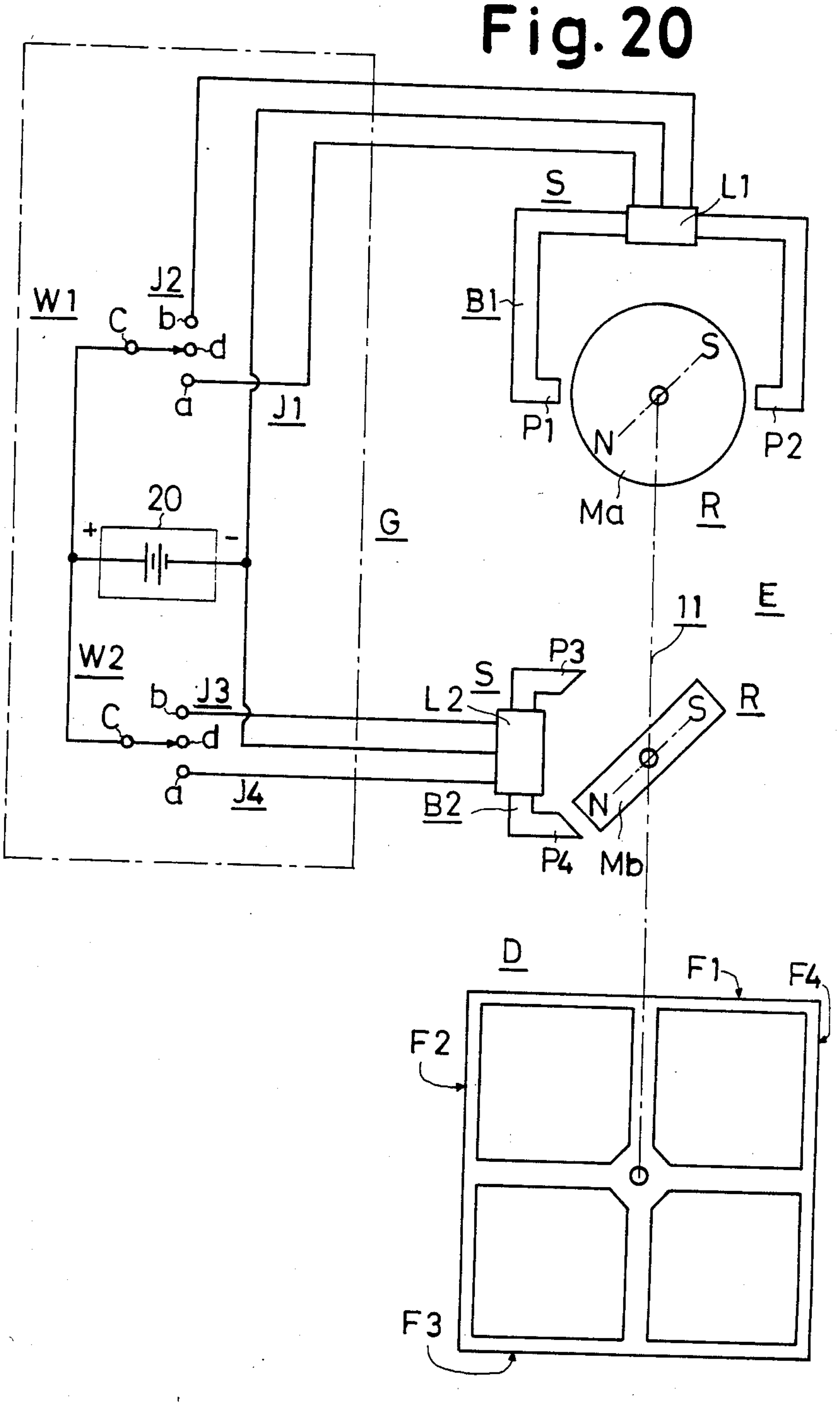
Figure 21:
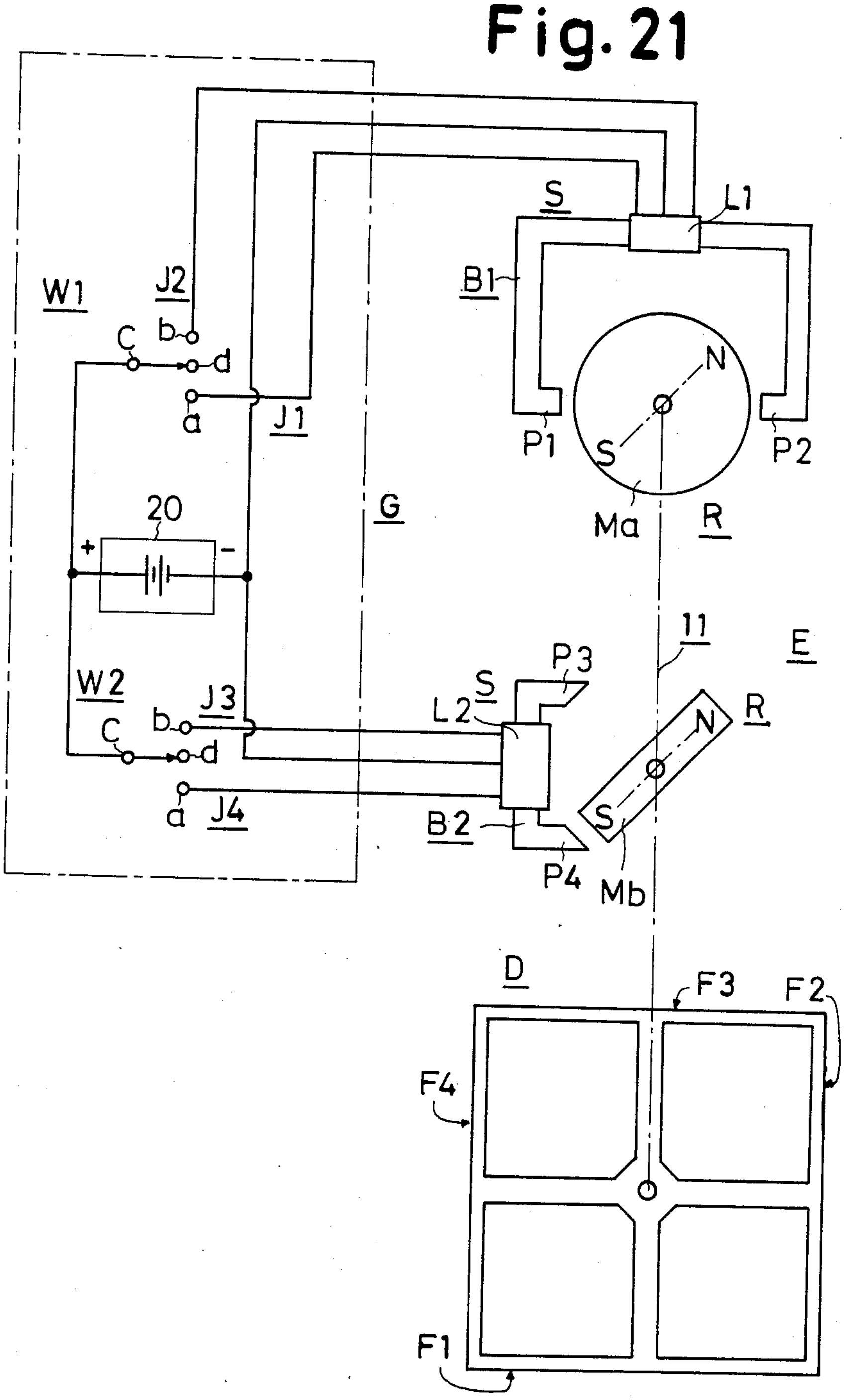
Figure 22:
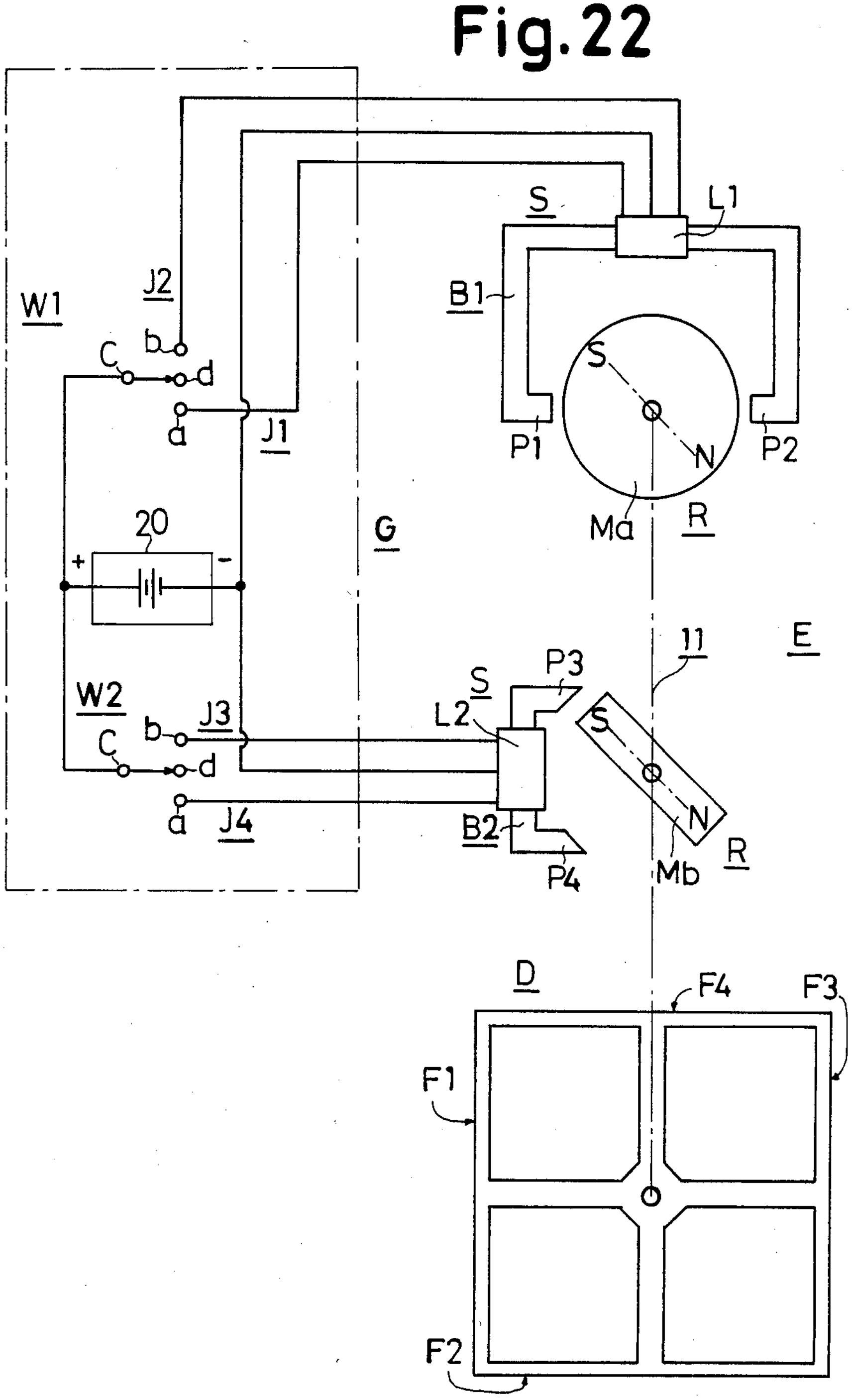
Figure 23:
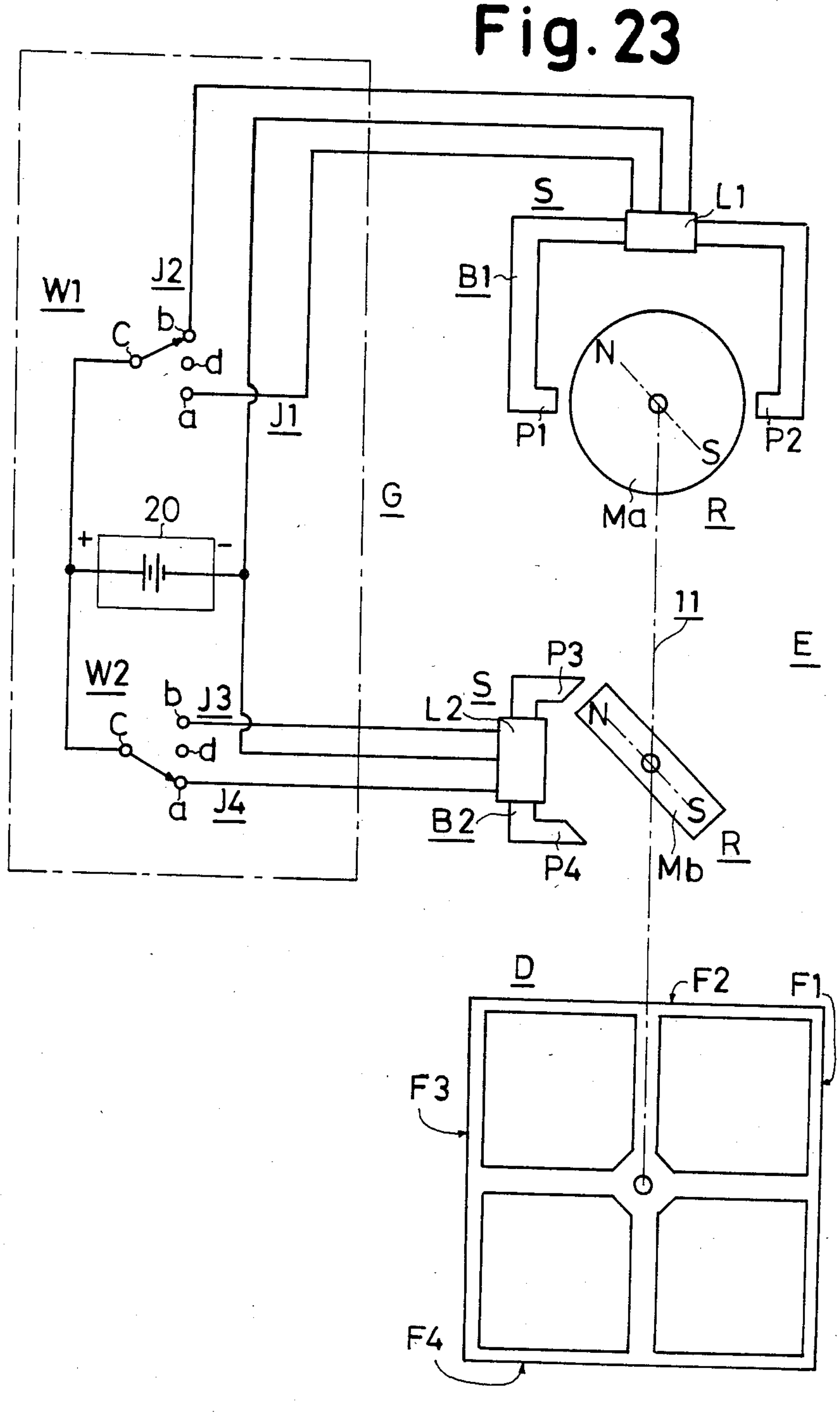
Figure 24:
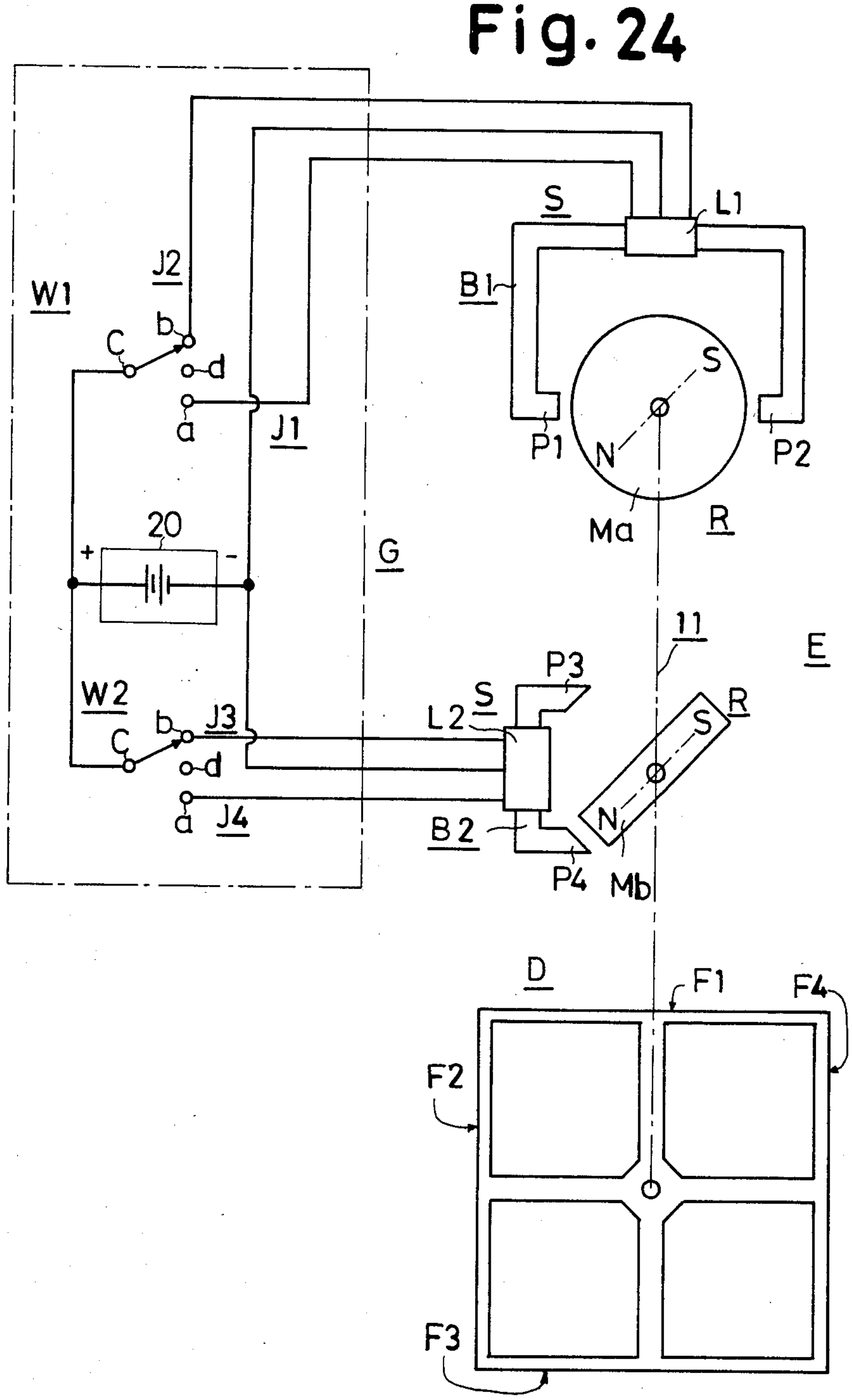
Figure 25:
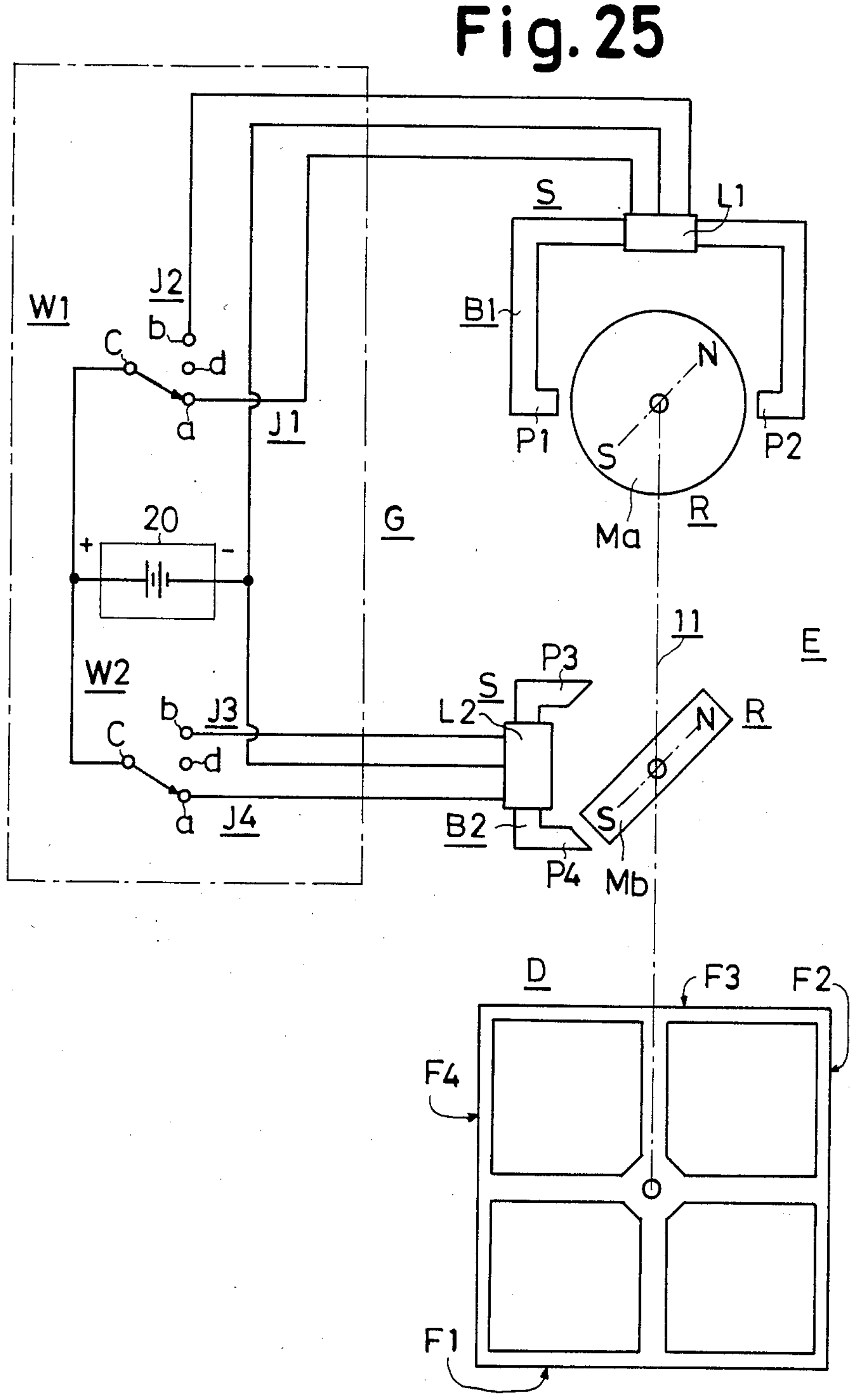
Figure 26:
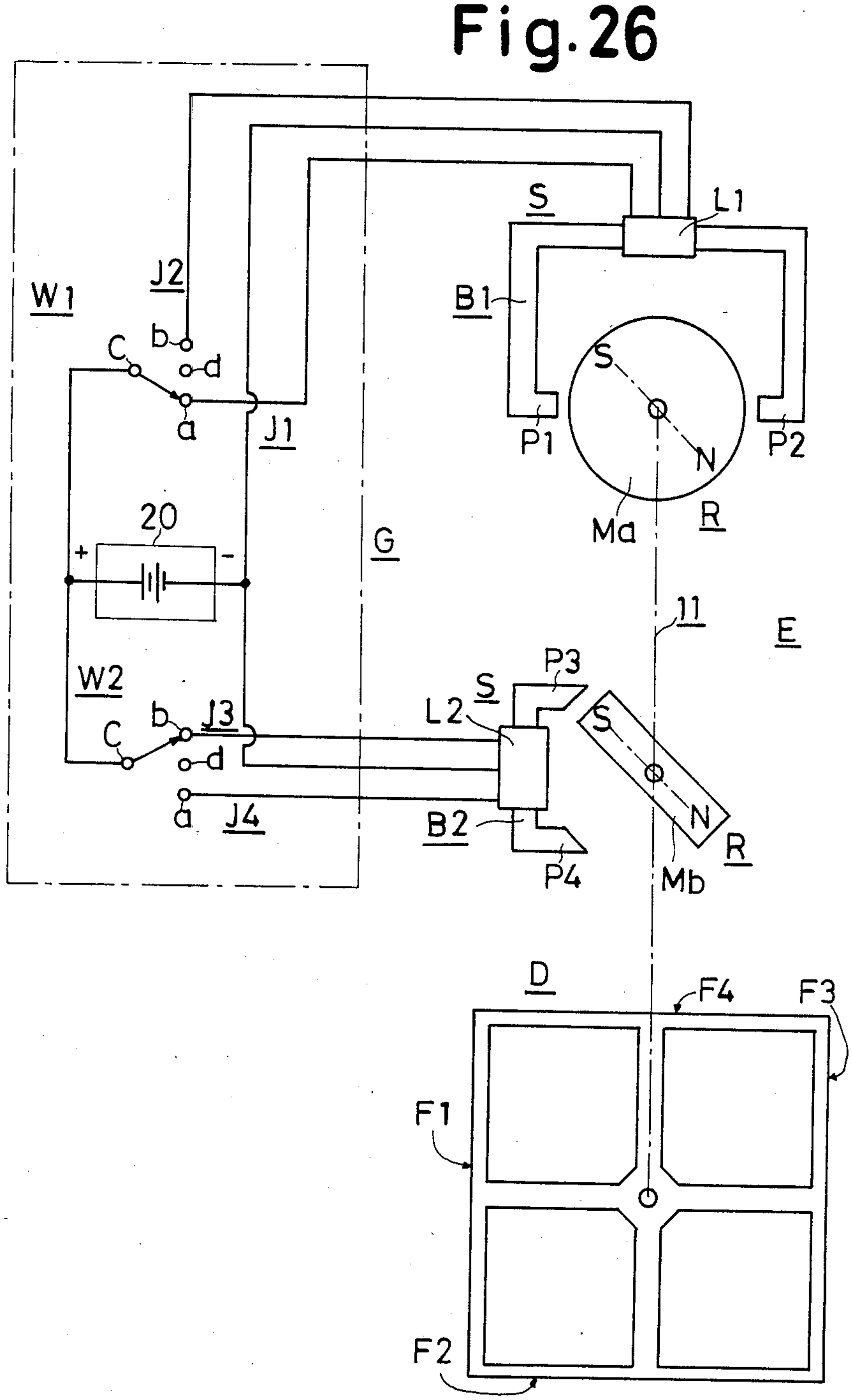

Moreover, while in the foregoing embodiment the magnetic poles P1 and P2 of the magnetic member B1 of the stator S are shown to be formed by the pairs of magnetic pole portions P1*a*, P1*b* and P2*a* and P2*b*, respectively, it is also possible to constitute each of the magnetic poles P1 and P2 by one magnetic pole portion as shown in FIGS. 16, 17 and 18 corresponding to FIGS. 2, 3 and 4 although no detailed description will be given. In this case, however, the double-pole permanent magnet M is turned to assume respective rotational positions as shown in FIGS. 19 to 26 corresponding to FIGS. 5 to 12 although no detailed description will be given.

Figure 27:
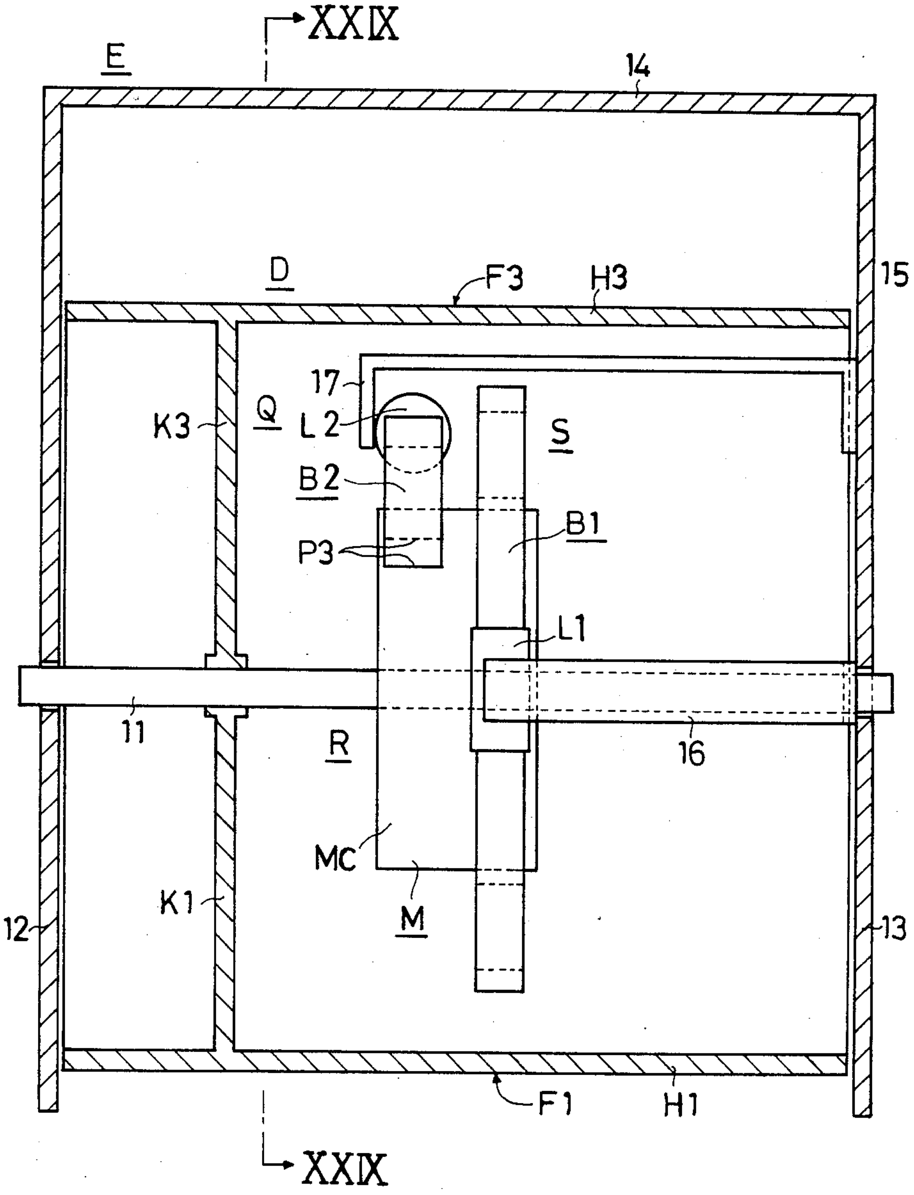
FIGS. 27 and 28 are a plan view and a front view, partly in section, illustrating still a further example of the rotating display element of the present invention.
Figure 28:
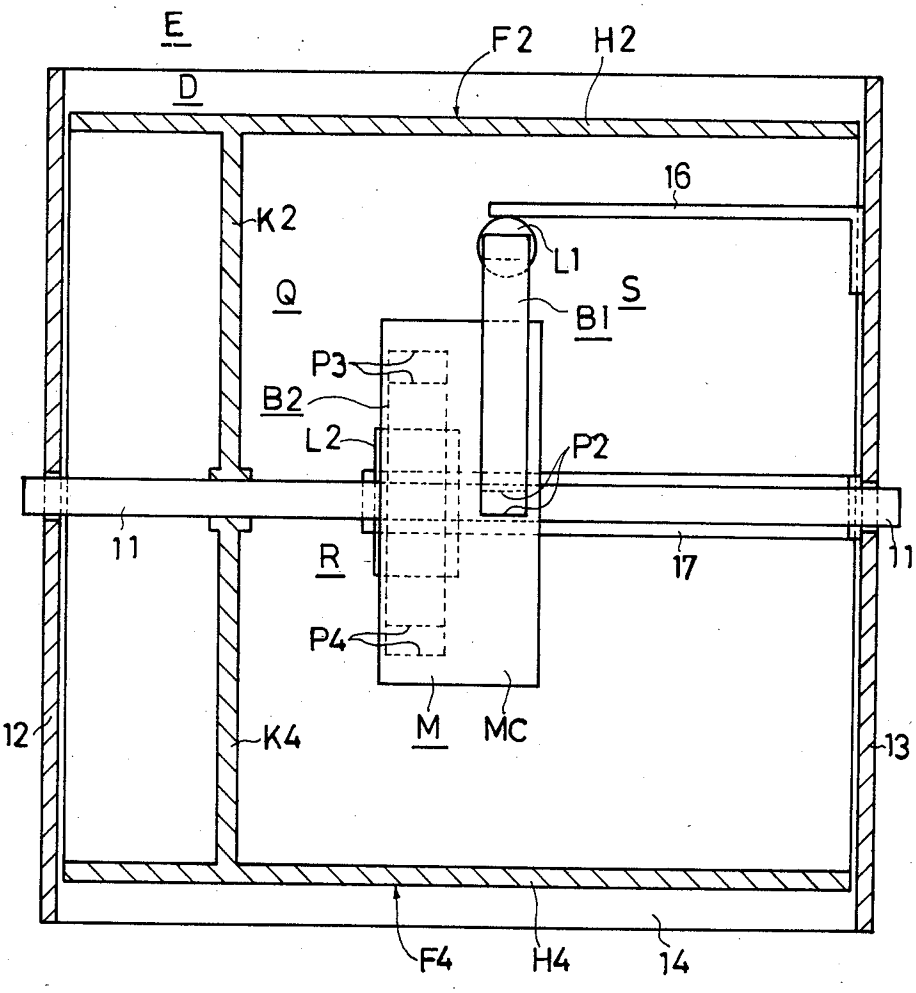
Figure 29:
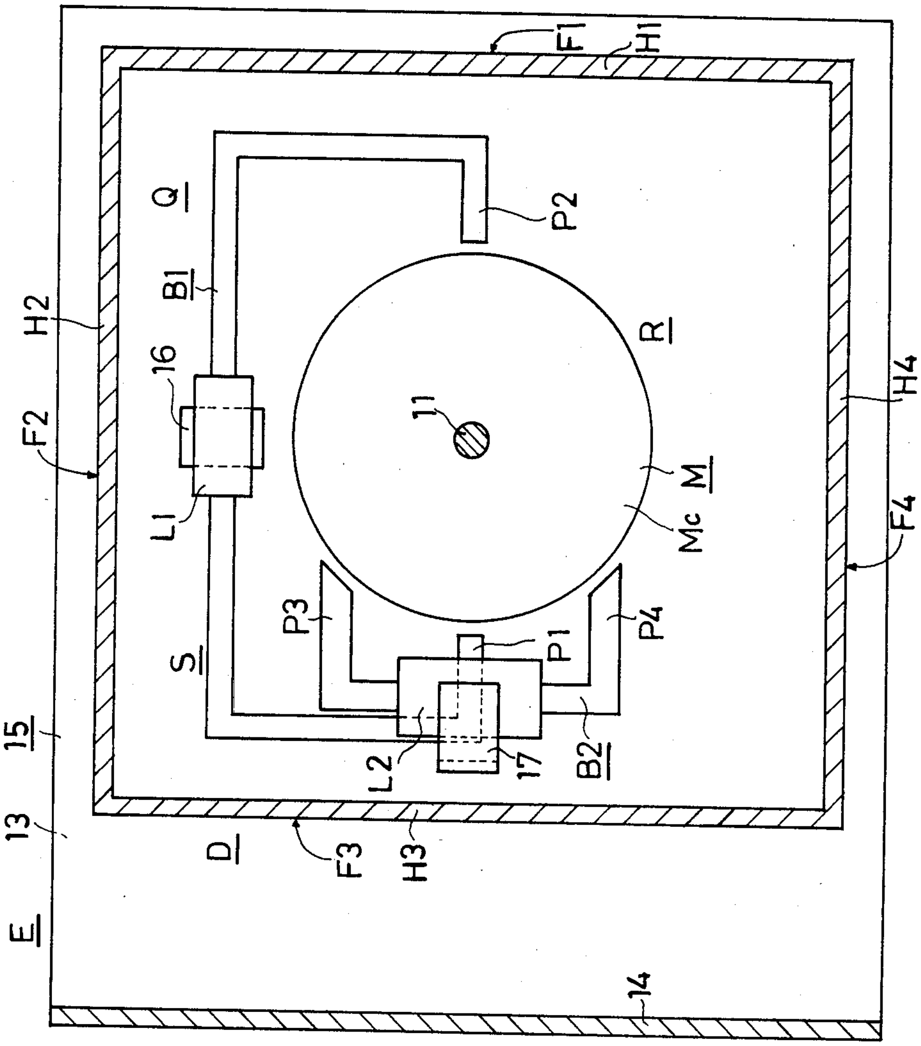
FIG. 29 is a side view, partly in section, as viewed from the line XXIX—XXIX in FIG. 27.

It is also possible, of course, that in the case where the magnetic poles P1 and P2 of the stator S are each formed by one magnetic pole portion as described above in respect of FIGS. 16 to 18, the double-pole permanent magnet M of the rotor R is formed by one double-pole permanent magnet MC as shown in FIGS. 27 to 29 corresponding to FIGS. 2 to 4.

It will be apparent that many modifications and variations may be effected without departing from the scope of the novel concepts of the present invention.

What is claimed is:

1. A rotating display element comprising:

a display surface structure (D) having sequentially disposed four display surface (F1 to F4); and a permanent magnet type stepping motor mechanism (Q);

wherein the display surface structure (D) is mounted on a rotor of the permanent magnet type stepping motor mechanism (Q) in a manner to incorporate therein the permanent magnet type stepping motor mechanism (Q);

wherein the four display surfaces (F1 to F4) of the display surface structure (D) are disposed at 90 intervals around the axis of the rotor;

wherein either one of the rotor and the stator of the permanent magnet type stepping motor mechanism (Q) is provided with a double-pole permanent magnet member (M) having first and second double-pole permanent magnets (Ma and Mb) disposed side by side in the lengthwise direction of the axis of rotor, the first and second double-pole permanent magnets (Ma and Mb) each having north and south magnetic poles spaced apart a 180° angular distance around the axis of the rotor; and wherein the other of the rotor and the stator of the permanent magnet type stepping motor mechanism (Q) is provided with a first magnetic member (B1) having first and second magnetic poles (P1 and P2) acting on the north and south magnetic poles of the first double-pole permanent magnet (Ma), a second magnetic member (B2) having third and fourth magnetic poles (P3 and P4) acting on the north and south magnetic poles of the second double-pole permanent magnet (Mb), a first exciting winding (L1) wound on the first magnetic member (B1) in manner to excite the first and second magnetic poles (P1 and P2) in reverse polarities, and a second exciting winding (L2) wound on the second magnetic member (B2) in a manner to excite third and fourth magnetic poles (P3 and P4) in reverse polarities, the first and second magnetic poles (P1 and P2) of the first magnetic member (B1) being disposed at 180° intervals around the axis of the rotor, the third and fourth magnetic poles (P3 and P4) of the second magnetic member (B2) being disposed at 90° intervals around the axis of the rotor, the first magnetic pole (P1) of the first magnetic member (B1) comprising first and second magnetic pole portions (P1*a* and P1*b*) disposed at 90° intervals around the axis of the rotor, and the second magnetic pole (P2) of the first magnetic member (B1) comprising third and fourth magnetic pole portions (P2*a* and P2*b*) disposed at 90° intervals around the axis of the rotor.

2. A display unit comprising:

a rotating display element (E); and a driving device (G) for driving the rotating display element (E);

wherein the rotating display element (E) comprises a display surface structure having sequentially disposed four display surfaces (F1 to F4), and a permanent magnet type stepping motor mechanism (Q);

wherein the display surface structure (D) is mounted on a rotor of the permanent magnet type stepping motor mechanism (Q) in a manner to incorporate therein the permanent magnet type stepping motor mechanism (Q);

wherein the four display surfaces (F1 to F4) of the display surface structure (D) are disposed at 90° intervals around the axis of the rotor;

wherein either one of the rotor and the stator of the permanent magnet type stepping motor mechanism (Q) is provided with a double-pole permanent magnet member (M) having first and second double-pole permanent magnets (Ma and Mb) disposed side by side in the lengthwise direction of the axis of rotor, the first and second double-pole permanent magnets (Ma and Mb) each having north and south magnetic poles spaced apart a 180° angular distance around the axis of the rotor; and wherein the other of the rotor and the stator of the permanent magnet type stepping motor mechanism (Q) is provided with a first magnetic member (B1) having first and second magnetic poles (P1 and P2) acting on the north and south magnetic poles of the first double-pole permanent magnet (Ma), a second magnetic member (B2) having third or fourth magnetic poles (P3 and P4) acting on the north and south magnetic poles of the second double-pole permanent magnet (Mb), a first exciting winding (L1) wound on the first magnetic member (B1) in a manner to excite the first and second magnetic poles (P1 and P2) in reverse polarities, and a second exciting winding (L2) wound on the second magnetic member (B2) in a manner to excite third and fourth magnetic poles (P3 and P4) in reverse polarities, the first and second magnetic poles (P1 and P2) of the first magnetic member (B1) being disposed at 180° intervals around the axis of the rotor, the third and fourth magnetic poles (P3 and P4) of the second magnetic member (B2) being disposed at 90° intervals around the axis of the rotor, the first magnetic pole (P1) of the first magnetic member (B1) comprising first and second magnetic pole portions (P1*a* and P1*b*) disposed at 90 intervals around the axis of the rotor, and the second magnetic pole (P2) of the first magnetic member (B1) comprising third and fourth magnetic pole portions (P2*a* and P2*b*) disposed at 90° intervals around the axis of the rotor; and wherein the driving device (G) comprising first power supply means (J1) for supplying power to the first exciting winding (L1) to magnetize the first and second magnetic poles (P1 and P2) of the first magnetic member (B1) with north and south magnetic poles, respectively, second power supply means (J2) for supplying power to the first exciting winding (L1) to magnetize the first and second magnetic poles (P1 and P2) of the first magnetic member (B1) with south and north magnetic poles, respectively, third power supply means (J3) for supplying power to the second exciting winding (L2) to magnetize the third and fourth magnetic poles (P3 and P4) of the second magnetic member (B2) with north and south magnetic poles, respectively, forth power supply means (J4) for supplying power to the second exciting winding (L2) to magnetize the third and fourth magnetic poles (P3 and P4) of the second magnetic member with south and north magnetic poles, respectively; and means for selecting one of the first and second power supply means (J1 and J2) for connection to the first exciting winding (L1) and selecting one of the third and fourth power supply means (J3 and J4) for connection to the second exciting winding (L2) so that the state of display in which one of the four display surfaces (F1 to F4) of the display surface structure (D) faces the front is changed over to another state of display in which another display surface faces the front.

* * * * *